US012592757B2

(12) United States Patent
Chen

(10) Patent No.: US 12,592,757 B2
(45) Date of Patent: Mar. 31, 2026

(54) METHOD FOR DETERMINING CHANNEL STATE INFORMATION, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 355 days.

(21) Appl. No.: 18/448,438

(22) Filed: Aug. 11, 2023

(65) Prior Publication Data

US 2023/0387995 A1 Nov. 30, 2023

Related U.S. Application Data

(63) Continuation of application No. PCT/CN2021/091969, filed on May 6, 2021.

(51) Int. Cl.
H04B 7/06 (2006.01)
(52) U.S. Cl.
CPC ................................. H04B 7/0626 (2013.01)
(58) Field of Classification Search
CPC .......... H04B 7/06–0634; H04L 5/0035; H04L 5/0057; H04L 5/0062; H04L 5/0063; H04L 5/0094
See application file for complete search history.

(56) References Cited

U.S. PATENT DOCUMENTS

| | | | | |
|---|---|---|---|---|
| 2022/0256561 A1* | 8/2022 | Kim | ...................... | H04L 5/0094 |
| 2022/0321175 A1* | 10/2022 | Tosato | .................. | H04L 5/0035 |
| 2024/0063870 A1* | 2/2024 | Gao | ...................... | H04L 5/0057 |
| 2024/0372589 A1* | 11/2024 | Nilsson | ................ | H04B 7/0626 |

FOREIGN PATENT DOCUMENTS

WO 2020144602 7/2020

OTHER PUBLICATIONS

"3rd Generation Partnership Project; Technical Specification Group Radio Access Network; NR; Radio Resource Control (RRC) protocol specification (Release 15)," 3GPP TS 38.331, Jun. 2018, v15.2.1.
"3rd Generation Partnership Project; Technical Specification Group Radio Access Network; NR; Physical layer procedures for data (Release 16)," 3GPP TS 38.214, Mar. 2021, v16.5.0.
Qualcomm Incorporated, "CSI enhancements: MTRP and FR1 FDD reciprocity," 3GPP TSG RAN WG1 #104bis-e, R1-2103156, Apr. 2021.

(Continued)

*Primary Examiner* — Habte Mered
*Assistant Examiner* — Prince A Mensah
(74) *Attorney, Agent, or Firm* — Hodgson Russ LLP

(57) ABSTRACT

A method for determining channel state information (CSI) includes the following. A terminal device determines, according to whether a non-zero power (NZP) channel state information-reference signal (CSI-RS) resource is available for CSI measurements under different measurement assumptions, the number of bits of a CSI-RS resource indicator (CRI) in CSI and/or NZP CSI-RS resources respectively indicated by different values of the CRI in the CSI.

20 Claims, 5 Drawing Sheets

(56)          References Cited

OTHER PUBLICATIONS

ZTE, "CSI enhancements for Multi-TRP and FR1 FDD reciprocity,"
3GPP TSG RAN WG1 #104b-e, R1-2102666, Apr. 2021.
Nokia et al., "Enhancement on CSI measurement and reporting,"
3GPP TSG RAN WG1 Meeting #104bis-e, R1-2103371, Apr. 2021.
WIPO, International Search Report and Written Opinion for Inter-
national Application No. PCT/CN2021/091969, Jan. 27, 2022.
EPO, Extended European Search Report issued for EP Application
No. 21939658.7, Feb. 23, 2024.

* cited by examiner

<u>100</u>

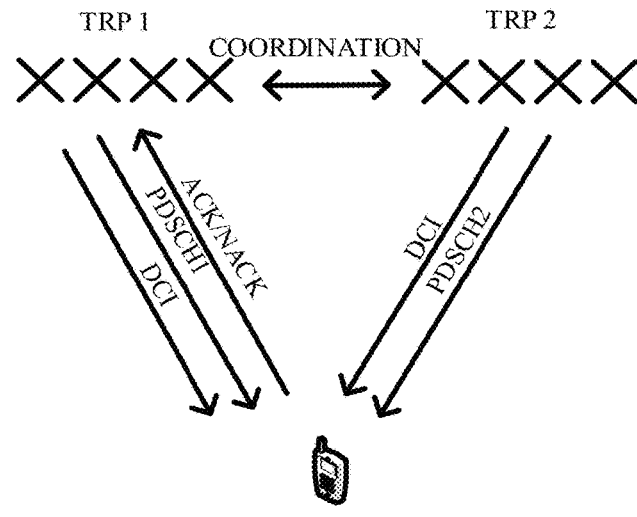
FIG. 2B
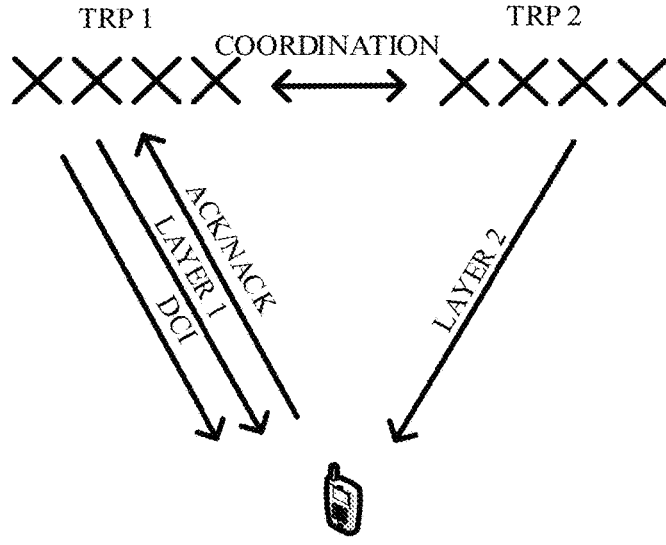
FIG. 3
400
Determine, by a terminal device, the number of bits of a CSI-reference signal (CSI-RS) resource indicator (CRI) in CSI and/or non-zero power (NZP) CSI-RS resources respectively indicated by different values of the CRI in the CSI, according to whether an NZP CSI-RS resource is available for CSI measurements under different measurement assumptions
S410
FIG. 4

<u>500</u>

Determine, by a network device, the number of bits of a CSI-reference signal (CSI-RS) resource indicator (CRI) in CSI and/or non-zero power (NZP) CSI-RS resources respectively indicated by different values of the CRI in the CSI, according to whether an NZP resource is available for CSI measurements under different measurement assumptions

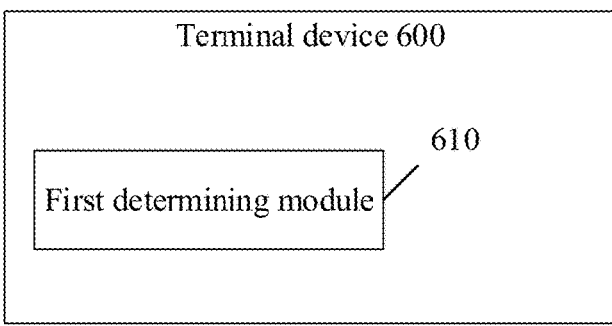

Terminal device 600

610

First determining module

FIG. 6

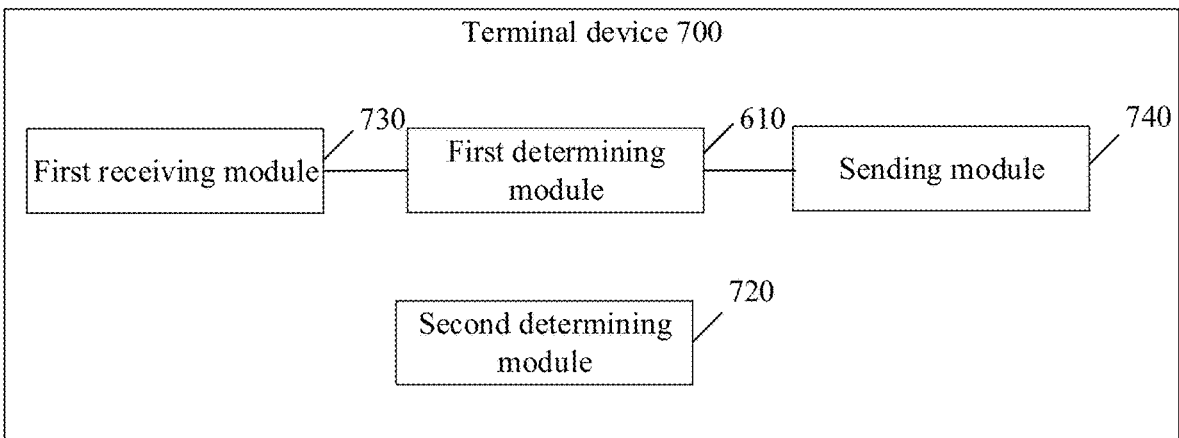

Terminal device 700

730
First receiving module

610
First determining module

740
Sending module

720
Second determining module

FIG. 7

METHOD FOR DETERMINING CHANNEL STATE INFORMATION, TERMINAL DEVICE, AND NETWORK DEVICE

CROSS-REFERENCE TO RELATED APPLICATION(S)

This application is a continuation of International Application No. PCT/CN2021/091969, filed May 6, 2021, the entire disclosure of which is incorporated herein by reference.

TECHNICAL FIELD

The present disclosure relates to the field of communications, and in particular, to a method for determining channel state information, a terminal device, and a network device.

BACKGROUND

In order to enable a network device to perform reasonable scheduling, a terminal device needs to feed back downlink channel state information (CSI). Specifically, the terminal device performs CSI reporting based on CSI reporting setting indicated by the network device, and an uplink (UL) resource used by the terminal device to perform CSI reporting and a downlink (DL) reference signal for CSI measurement are both indicated by the CSI reporting setting. Each CSI reporting setting corresponds to one CSI reporting, and each CSI reporting may contain information such as a CSI-reference signal (CSI-RS) resource indicator (CRI), a rank indicator (RI), a pre-coding matrix indicator (PMI), and a channel quality indicator (CQI).

In a new radio (NR) system, DL and UL non-coherent transmission based on multiple transmission/reception points (TRPs) is introduced. In the related art, in order to perform CSI measurement for multiple coordinated TRPs, the network device can configure two channel measurement resource (CMR) groups for the terminal device, and each CMR group is used for CSI measurement for a single TRP. The terminal device can perform measurement based on two configured CMR groups, so as to determine whether current optimal CSI is obtained through measurement based on a single TRP (namely, a single CMR group or a single CMR) or through measurement based on multiple TRPs (namely, two CMR groups or two CMRs). The former corresponds to a measurement assumption of single TRP transmission, and the latter corresponds to a measurement assumption of non-coherent joint transmission (NC-JT). The terminal device can report, through a CRI in CSI, a currently recommended measurement assumption and information corresponding to the measurement assumption such as CSI, an RI, a PMI, and a CQI. At present, how to determine the number of bits of a CRI in CSI reported by the terminal device to the network device and contents respectively indicated by different values of the CRI to enable the network device to obtain accurate channel information with relatively small feedback overhead and improve the efficiency of UL transmission is a problem to be solved.

SUMMARY

Implementations of the present disclosure provide a method for determining channel state information (CSI), a terminal device, and a network device.

The implementations of the present disclosure provide a method for determining CSI. The method includes the following. A terminal device determines, according to whether a non-zero power (NZP) CSI-reference signal (RS) resource is available for CSI measurements under different measurement assumptions, the number of bits of a CSI-RS resource indicator (CRI) in CSI and/or NZP CSI-RS resources respectively indicated by different values of the CRI in the CSI.

The implementations of the present disclosure further provide a terminal device. The terminal device includes a transceiver, a processor coupled to the transceiver, and a memory configured to store a computer program. The processor is configured to execute the computer program to cause the terminal device to determine, according to whether an NZP CSI-RS resource is available for CSI measurements under different measurement assumptions, the number of bits of a CRI in CSI and/or NZP CSI-RS resources respectively indicated by different values of the CRI in the CSI.

The implementations of the present disclosure further provide a network device. The network device includes a transceiver, a processor coupled to the transceiver, and a memory configured to store a computer program. The processor is configured to execute the computer program to cause the network device to determine, according to whether an NZP CSI-RS resource is available for CSI measurements under different measurement assumptions, the number of bits of a CRI in CSI and/or NZP CSI-RS resources respectively indicated by different values of the CRI in the CSI.

BRIEF DESCRIPTION OF THE DRAWINGS

FIG. 2B is schematic diagram 2 illustrating DL non-coherent transmission based on multiple PDCCHs.

FIG. 3 is a schematic diagram illustrating DL non-coherent transmission based on a single PDCCH.

FIG. 4 is a schematic flow chart of a method for determining channel state information (CSI) according to implementations of the present disclosure.

FIG. 5 is another schematic flow chart illustrating a method for determining CSI according to implementations of the present disclosure.

FIG. 6 is a schematic structural diagram of a terminal device according to implementations of the present disclosure.

FIG. 7 is another schematic structural diagram of a terminal device according to implementations of the present disclosure.

DETAILED DESCRIPTION

Figure 1:
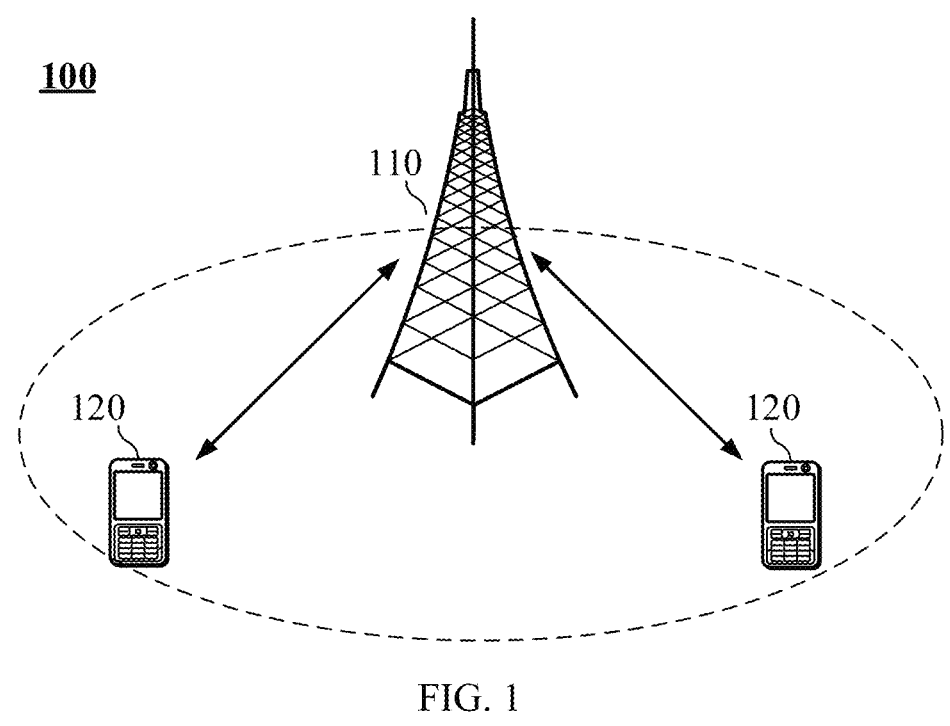
FIG. 1 is a schematic diagram of an application scenario according to implementations of the present disclosure.

The following will describe technical solutions in implementations of the present disclosure with reference to accompanying drawings in the implementations of the present disclosure.

It is to be noted that terms such as "first" and "second" in the specification, the claims, and the accompanying drawings of the implementations of the present disclosure are used to distinguish similar objects, and are not necessarily used to describe a specific sequence or order. The objects described by "first" and "second" may be the same or different.

The technical solutions in the implementations of the present disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, a NR-based access to unlicensed spectrum (NR-U) system, a universal mobile telecommunication system (UMTS), a wireless local area networks (WLAN), a wireless fidelity (WiFi), a next-generation ($5^{th}$- generation) communication system, or other communication systems.

Generally, a traditional communication system can support a limited number of connections and is easy to implement. However, with the development of communication technologies, a mobile communication system not only can support traditional communication, but also can support, for example, device to device (D2D) communication, machine to machine (M2M) communication, machine type communication (MTC), and vehicle to vehicle (V2V) communication. The implementations of the present disclosure may also be applied to these communication systems.

Optionally, the communication system in the implementations of the present disclosure may be applied to a carrier aggregation (CA) scenario, a dual connectivity (DC) scenario, and a standalone (SA) scenario.

A spectrum applied is not limited in the implementations of the present disclosure. For example, the implementations of the present disclosure can be applied to a licensed spectrum and also can be applied to an unlicensed spectrum.

The implementations of the present disclosure are described in conjunction with a network device and a terminal device. The terminal device may also be referred to as a user equipment (UE), an access terminal, a user unit, a user station, a mobile station, a remote station, a remote terminal, a mobile device, a user terminal, a terminal, a wireless communication device, a user agent, or a user apparatus. The terminal device may be a station (ST) in a WLAN, a cellular phone, a cordless phone, or a session initiation protocol (SIP) phone, a wireless local loop (WLL) station, a personal digital assistant (PDA) device, or may be a device with a wireless communication function such as a handheld device, a computing device or other processing device connected to a wireless modem, an in-vehicle device, or a wearable device, or may be a terminal device in a next generation communication system, for example, a terminal device in an NR network or a future evolved public land mobile network (PLMN) network.

As an example but not limitation, in the implementations of the present disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like.

The network device may be a device that can communicate with a mobile device. The network device may be an access point (AP) in the WLAN, a base transceiver station (BTS) in the GSM or CDMA system, or a NodeB (NB) in the WCDMA system. Alternatively, the network device may be an evolutional NodeB (eNB or eNodeB), a relay station, an AP, an in-vehicle device, or a wearable device in the LTE, a generation NodeB (gNB) in the NR network, or a network device in the future evolved PLMN.

In the implementations of the present disclosure, the network device can provide service for a cell, and the terminal device can communicate with the network device through transmission resources (e.g., frequency-domain resources or spectrum resources) for the cell. The cell may be a cell corresponding to the network device (e.g., a base station). The cell may belong to a macro base station or a base station corresponding to a small cell. The small cell may include a metro cell, a micro cell, a pico cell, a femto cell, or the like. These small cells have features of small coverage ranges and low transmission power and are suitable for providing high-speed data transmission services.

FIG. 1 exemplarily illustrates a network device 110 and one or two or more terminal devices 120. Optionally, the wireless communication system 100 may include one or two or more network devices 110, and in the coverage of each network device 110, other numbers of terminal devices 120 may be included, and the implementations of the present disclosure are not limited thereto. The implementations of the present disclosure may be applied to one terminal device 120 and one network device 110, and may also be applied to one terminal device 120 and another terminal device 120.

Optionally, the wireless communication system 100 can further include other network entities, such as a mobility management entity (MME) and an access and mobility management function (AMF), and the implementations of the present disclosure are not limited thereto.

It can be understood that, the terms "system" and "network" in the present disclosure are often used interchangeably. The term "and/or" in the present disclosure is simply an illustration of an association relationship of associated objects, indicating that three relationships can exist, for example, A and/or B, which can indicate the existence of A alone, A and B together, and B alone. In addition, the character "/" in the present disclosure generally indicates that associated objects are in an "or" relationship.

It is to be understood that, the "indication" mentioned in the implementations of the present disclosure may be a direct indication, an indirect indication, or an indication indicating an association relation. For example, A indicates B, which may indicate that A directly indicates B, for example, B may be obtained through A; or may indicate that A indirectly indicates B, for example, A indicates C, and B may be acquired through C; or may mean that A and B have an association relationship.

In illustration of the implementations of the present disclosure, the term "correspondence" may represent a direct correspondence or indirect correspondence between the two, may also represent an associated relation between the two, or may further represent a relation of indicating and being indicated, a relation of configuring and being configured, or other relations.

In order to facilitate understanding of the technical solutions of the implementations of the present disclosure, the following describes the related technical solutions of the implementations of the present disclosure. The following related technical solutions as optional solutions may be arbitrarily combined with the technical solutions of the implementations of the present disclosure, which all belong to the scope of protection of the implementations of the present disclosure.

Downlink (DL) no-coherent transmission is introduced as follows.

DL and uplink (UL) no-coherent transmission based on multiple transmission/reception points (TRPs) is introduced in an NR system. Backhaul between TRPs may be ideal or non-ideal. TRPs in ideal backhaul can perform information interaction rapidly and dynamically. TRPs in non-ideal backhaul can only perform information interaction quasi-statically due to a relatively great time delay. In DL non-coherent transmission, multiple TRPs can separately schedule transmission of multiple physical downlink shared channels (PDSCHs) for a terminal device by using different control channels, and different TRPs can also schedule transmission by using the same control channel, where transmission of data of different TRPs can use different transmission layers, and the latter can only be used in ideal backhaul.

Figure 2A:
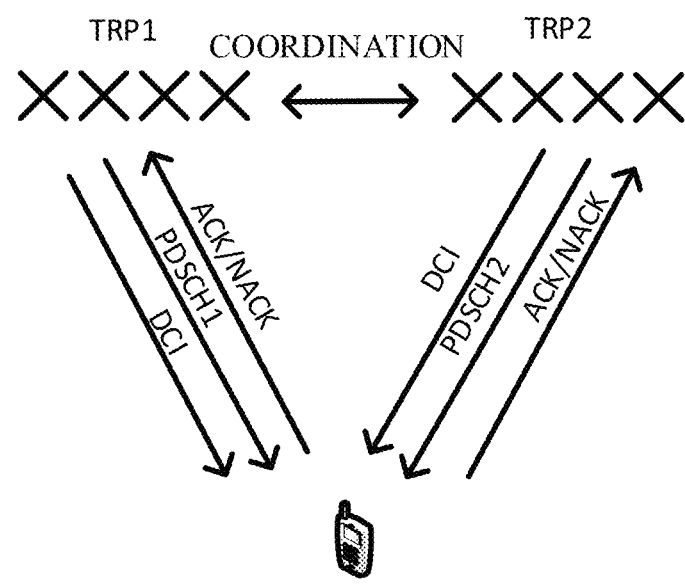
FIG. 2A is schematic diagram 1 illustrating downlink (DL) non-coherent transmission based on multiple physical downlink control channels (PDCCHs).

FIGS. 2A and 2B are schematic diagrams illustrating DL non-coherent transmission based on multiple PDCCHs. For DL transmission scheduled by using multiple PDCCHs, scheduled PDSCHs may be transmitted in the same slot or different slots. The terminal device needs to support simultaneous reception of PDCCHs and PDSCHs from different TRPs. To feed back acknowledgement (ACK)/negative acknowledgement (NACK) and CSI, the terminal device can feed back ACK/NACK and CSI to a TRP transmitting a corresponding PDSCH as illustrated in FIG. 2A, or can report joint ACK/NACK and CSI to a single TRP as illustrated in FIG. 2B. The former can be applied to both a scenario of ideal backhaul and a scenario of non-ideal backhaul, and the latter can only be applied to the scenario of ideal backhaul. Downlink control information (DCI) for PDSCH scheduling and transmitted by different TRPs can be carried by different control resource sets (CORESETs), i. e., a network side can configure multiple CORESETs, and the TRPs can perform scheduling by using respective CORESETs, i. e., different TRPs can be distinguished by CORESETs. For example, the network device can configure a CORESENT group index for each CORESENT, and different CORESENT group indexes correspond to different TRPs. To feed back CSI, the terminal device needs to feed back CSI corresponding to each of the TRPs, where the CSI corresponding to each TRP contains a rank indicator (RI), a pre-coding matrix indicator (PMI), a channel quality indicator (CQI), and so on, and can be used by each TRP to schedule DL transmission.

FIG. 3 is a schematic diagram illustrating DL non-coherent transmission based on a single PDCCH. For multi-TRP DL transmission scheduled by using a single PDCCH, the same DCI can be used to schedule multiple transmission layers of different TRPs. The transmission layers of different TRPs can adopt demodulation reference signal (DMRS) ports in different code division multiple (CDM) groups, and adopt different transmission configuration indication (TCI) states. The network device needs to indicate, in one DCI, DMRS ports from different CDM groups and TCI states respectively corresponding to different CDM groups, thereby supporting that at different DMRS ports transmission is performed by using different beams. In this case, for hybrid automatic repeat request acknowledgement (HARQ-ACK) feedback, a mechanism in the existing protocol can be reused. This solution can only be applied to the scenario of ideal backhaul. In this case, the terminal device needs to report, through one CSI, RIs and PMIs respectively corresponding to different TRPs and a joint CQI (used for determining a modulation and coding scheme (MCS)).

DL CSI reporting is introduced as follows.

In order to enable a network device to perform reasonable scheduling, a terminal device needs to feed back DL CSI, so that a base station can perform reasonable scheduling, for example, the base station can determine scheduling information of the terminal device, such as the number of transmission layers, a pre-coding matrix, a transmit beam, and an MCS. Specifically, the terminal device performs CSI reporting based on CSI reporting setting indicated by the network device, and a UL resource used by the terminal device to perform CSI reporting and a DL reference signal (RS) used by the terminal device to perform CSI measurement are both indicated by the CSI reporting setting. Each CSI reporting setting corresponds to one CSI reporting, and each CSI reporting may contain different information such as a CSI-RS resource indicator (CRI), an RI, a PMI, and a CQI. Specifically, contents/information contained in CSI is determined by report quantity (reportQuantity) in the CSI reporting setting.

In the related art, in order to perform CSI measurement for multiple coordinated TRPs, a network device may configure two channel measurement resource (CMR) groups for a terminal device, and each CMR group is used for CSI measurement for a single TRP. The terminal device performs measurement based on two configured CMR groups, so as to determine whether the current optimal CSI is obtained through measurement based on a single TRP (namely, a single CMR group or a single CMR) or is obtained through measurement based on multiple TRPs (namely, two CMR groups or two CMRs). The former corresponds to a measurement assumption of single TRP transmission, and the latter corresponds to a measurement assumption of non-coherent joint transmission (NC-JT). The terminal device can report, through a CRI in CSI, a currently recommended measurement assumption and CSI corresponding to the measurement assumption, such as an RI, a PMI, a CQI, etc. Currently, how to report, through a CRI, a recommended measurement assumption and CSI corresponding to the recommended measurement assumption with least signaling overhead is a problem to be solved.

The implementations of the present disclosure provide a method for determining CSI. FIG. 4 is a schematic flow chart of a method for determining CSI according to the implementations of the present disclosure. The method can be optionally applied to the system illustrated in FIGS. 1 to 3, but is not limited thereto. The method includes at least part of the following.

S410, the terminal device determines, according to whether a non-zero power (NZP) CSI-RS resource is available for CSI measurements under different measurement assumptions, the number of bits of a CRI in CSI and/or NZP CSI-RS resources respectively indicated by different values of the CRI in the CSI.

Optionally, the different measurement assumptions include a measurement assumption of TRP transmission and a measurement assumption of NC-JT.

Optionally, the CSI measurements under the different measurement assumptions include a CSI measurement based on a single CMR (hereinafter, single CMR-based CSI measurement) and a CSI measurement based on a single CMR pair (hereinafter, single CMR pair-based CSI measurement).

In some implementations, the method can further include the following. The terminal device receives an NZP CSI-RS resource set for channel measurements configured by a network device, where the NZP CSI-RS resource set includes a first CMR group and a second CMR group. The NZP CSI-RS resource set includes at least one CMR pair for the CSI measurement under the measurement assumption of NC-JT, and each of the at least one CMR pair includes one CMR in the first CMR group and one CMR in the second CMR group.

In the present disclosure, a CMR is an NZP CSI-RS resource for channel measurements, and thus a CMR group can also be referred to as an NZP CSI-RS resource group.

For example, it is assumed that the NZP CSI-RS resource set contains K NZP CSI-RS resources, and the NZP CSI-RS resource set contains a CMR group the number of CMRs of which is K1, and another CMR group the number of CMRs of which is K2, where $K=K_1+K_2$. The CMRs in each CMR group are configured for the terminal device by the network device through higher-layer signaling. In addition, the network device can further configure, through higher-layer signaling, N CMR pairs for measurement of NC-JT, and each CMR pair contains two CMRs respectively from the two CMR groups. For example, one CMR pair contains CMR 1 and CMR 2, where CMR 1 is from one CMR group and CMR 2 is from another CMR group.

Based on the NZP CSI-RS resource set configured by the network device, the terminal device can perform CSI measurement.

In an implementation, the terminal device can perform a CSI measurement for a single TRP based on each of K CMRs (NZP CSI-RS resources) in the NZP CSI-RS resource set, i. e., each CSI measurement is based on a single CMR. The terminal device can further perform the CSI measurement under the measurement assumption of NC-JT based on each of the N CMR pairs for measurement of NC-JT, that is, each CSI measurement is based on a single CMR pair (two CMRs). In this case, one NZP CSI-RS resource can be used for the CSI measurement under the measurement assumption of single TRP transmission, and can also be used for the CSI measurement under the measurement assumption of NC-JT.

In another implementation, the terminal device can perform the CSI measurement under the measurement assumption of NC-JT based on each of the N CMR pairs for measurement of NC-JT, and can also perform the CSI measurement under the measurement assumption of single TRP transmission based on each of K−2N CMRs in the NZP CSI-RS resource set, and the K−2N CMRs do not include 2N CMRs (N CMR pairs) for measurement of NC-JT. As can be seen, in this case, one NZP CSI-RS resource cannot be used for both the CSI measurement under the measurement assumption of single TRP transmission and the CSI measurement under the measurement assumption of NC-JT.

In the present disclosure, the CSI measurement under the measurement assumption of single TRP transmission may also be referred to as a single CMR-based CSI measurement, and the CSI measurement under the measurement assumption of NC-JT may also be referred to as a single CMR pair-based CSI measurement. In the case of the CSI measurement under the measurement assumption of NC-JT, CSI contains two RIs, two PMIs, and one CQI. Therefore, the CSI measurement under the measurement assumption of NC-JT may also be referred to as a CSI measurement of first CSI, where the first CSI contains two RIs, two PMIs, and one CQI. The CSI measurement under the measurement assumption of single TRP transmission may also be referred to as a CSI measurement of second CSI, where the second CSI contains merely one RI and one PMI (and other information).

The terminal device determines, according to whether the NZP CSI-RS resource in the NZP CSI-RS resource set is available for the CSI measurements under the different measurement assumptions, the number of the bits of the CRI in the CSI and/or the NZP CSI-RS resources respectively indicated by the different values of the CRI in the CSI.

Specifically, there are at least three manners for the terminal device to determine whether the NZP CSI-RS resource is available for the CSI measurements under the different measurement assumptions.

In the first manner, the terminal device determines whether the NZP CSI-RS resource is available for the CSI measurements under the different measurement assumptions according to first higher-layer signaling. The first higher-layer signaling indicates whether an NZP CSI-RS resource for the CSI measurement under the measurement assumption of single TRP transmission is available for the CSI measurement under the measurement assumption of NC-JT. Alternatively, the first higher-layer signaling indicates whether an NZP CSI-RS resource for the single CMR-based CSI measurement is available for the single CMR pair-based CSI measurement.

Specifically, when the first higher-layer signaling indicates that the NZP CSI-RS resource for the CSI measurement under the measurement assumption of single TRP transmission is available for the CSI measurement under the measurement assumption of NC-JT, the terminal device determines that the NZP CSI-RS resource is available for the CSI measurements under different measurement assumptions. When the first higher-layer signaling indicates that the NZP CSI-RS resource for the CSI measurements under the measurement assumption of single TRP transmission is unavailable for the CSI measurement under the measurement assumption of NC-JT, the terminal device determines that the NZP CSI-RS resource is unavailable for the CSI measurements under the different measurement assumptions. Alternatively, when the first higher-layer signaling indicates that the NZP CSI-RS resource for the single CMR-based CSI measurement is available for the single CMR pair-based CSI measurement, the terminal device determines that the NZP CSI-RS resource is available for the CSI measurements under the different measurement assumptions. When the first higher-layer signaling indicates that the NZP CSI-RS resource for the single CMR-based CSI measurement is unavailable for the single CMR pair-based CSI measurement, the terminal device determines that the NZP CSI-RS resource is unavailable for the CSI measurements under different measurement assumptions.

The first higher-layer signaling may be sent from the network device to the terminal.

In the second manner, the terminal device determines whether the NZP CSI-RS resource is available for the CSI measurements under the different measurement assumptions, according to whether the CSI measurement is performed on a carrier of a frequency range 1 (FR1) or on a carrier of a frequency range 2 (FR2) or according to whether the NZP CSI-RS resource is configured on the carrier of the FR1 or on the carrier of the FR2.

For example, when the CSI measurement is performed on the carrier of the FR1, the terminal device determines that the NZP CSI-RS resource is available for the CSI measurements under the different measurement assumptions. When the CSI measurement is performed on the carrier of the FR2, the terminal device determines that the NZP CSI-RS resource is unavailable for the CSI measurements under the different measurement assumptions. Alternatively, when the NZP CSI-RS resource is configured on the carrier of the FR1, the terminal device determines that the NZP CSI-RS resource is available for the CSI measurements under the different measurement assumptions. When the NZP CSI-RS resource is configured on the carrier of the FR2, the terminal device determines that the NZP CSI-RS resource is unavailable for the CSI measurements under the different measurement assumptions. The foregoing determination manners are merely examples, and in the implementations of the present disclosure other determination manners are not excluded.

In the third manner, the terminal device determines whether the NZP CSI-RS resource is available for the CSI measurements under the different measurement assumptions according to terminal-capability report information. The terminal-capability report information indicates whether an NZP CSI-RS resource for the CSI measurement under the measurement assumption of single TRP transmission is available for the CSI measurement under the measurement assumption of NC-JT. Alternatively, the terminal-capability report information indicates whether an NZP CSI-RS resource for the single CMR-based CSI measurement is available for the single CMR pair-based CSI measurement.

The terminal-capability report information may be sent by the terminal device to the network device. When the terminal-capability report information sent by the terminal device to the network device indicates that the NZP CSI-RS resource for the CSI measurement under the measurement assumption of single TRP transmission is available for the CSI measurement under the measurement assumption of NC-JT, the terminal device determines that the NZP CSI-RS resource is available for the CSI measurements under the different measurement assumptions. When the terminal-capability report information sent by the terminal device to the network device indicates that the NZP CSI-RS resource for the CSI measurement under the measurement assumption of single TRP transmission is unavailable for the CSI measurement under the measurement assumption of NC-JT, the terminal device determines that the NZP CSI-RS resource is unavailable for the CSI measurements under different measurement assumptions. Alternatively, when the terminal-capability report information sent by the terminal device to the network device indicates that the NZP CSI-RS resource for the single CMR-based CSI measurement is available for the single CMR pair-based CSI measurement, the terminal device determines that the NZP CSI-RS resource is available for the CSI measurements under the different measurement assumptions. When the terminal-capability report information sent by the terminal device to the network device indicates that the NZP CSI-RS resource for the single CMR-based CSI measurement is unavailable for the single CMR pair-based CSI measurement, the terminal device determines that the NZP CSI-RS resource is unavailable for the CSI measurements under the different measurement assumptions.

If the CSI contains only one CRI, the CRI can be used to report a current optimal (recommended) measurement assumption in the measurement assumption of single TRP transmission and the measurement assumption of NC-JT, and report an optimal (recommended) CMR/CMR pair corresponding to the current optimal (recommended) measurement assumption.

In some implementations, in the case where the CSI contains merely one CRI, determine the number of the bits of the CRI in the CSI as follows. Determine that the number of the bits of the CRI is $\log_2(K+N)$ when the NZP CSI-RS resource is available for the CSI measurements under the different measurement assumptions; and/or determine that the number of the bits of the CRI is $\log_2(K-N)$ when the NZP CSI-RS resource is unavailable for the CSI measurements under the different measurement assumptions. K represents the number of NZP CSI-RS resources in the NZP CSI-RS resource set for channel measurements, and N represents the number of CMR pairs for the CSI measurement under the measurement assumption of NC-JT in the NZP CSI-RS resource set for channel measurements.

In some implementations, in the case where the CSI contains merely one CRI, determine the NZP CSI-RS resources respectively indicated by the different values of the CRI in the CSI as follows. When the NZP CSI-RS resource is available for the CSI measurements under the different measurement assumptions, determine that each of part of the values of the CRI indicates a resource in K NZP CSI-RS resources in the NZP CSI-RS resource set for channel measurements, and each of remaining part of the values of the CRI indicates a CMR pair in the N CMR pairs for the CSI measurement under the measurement assumption of NC-JT; and/or when the NZP CSI-RS resource is unavailable for the CSI measurements under the different measurement assumptions, determine that each of part of the values of the CRI indicates a resource in K−2N NZP CSI-RS resources for the CSI measurement under the measurement assumption of single TRP transmission, and each of remaining part of the values of the CRI indicates a CMR pair in the N CMR pairs for the CSI measurement under the measurement assumption of NC-JT.

Specifically, when the NZP CSI-RS resource is available for the CSI measurements under the different measurement assumptions, the number of the bits of the CRI is $\log_2(K+N)$, and the $\log_2(K+N)$ bits can indicate K+N values of the CRI, where each of part of the values (for example, the smallest K values) of the CRI indicates a resource in the K NZP CSI-RS resources in the NZP CSI-RS resource set, and each of another part of the values (for example, remaining N values) indicates a CMR pair in the N CMR pairs for the CSI measurement under the measurement assumption of NC-JT, as illustrated in table 1 below.

TABLE 1

| value of a CRI | NZP CSI-RS resource indicated |
|---|---|
| 0 | the first CMR in a set |
| 1 | the second CMR in the set |
| . . . | . . . |
| K − 1 | the Kth CMR in the set |
| K | the first CMR pair for a CSI measurement under a measurement assumption of NC-JT |
| K + 1 | the second CMR pair for the CSI measurement under the measurement assumption of NC-JT |
| . . . | . . . |
| K + N − 1 | the Nth CMR pair for the CSI measurement under the measurement assumption of NC-JT |

The foregoing table 1 is only an example. Contents in various rows of table 1 are independent of each other. In the present disclosure, any one row, two rows, or multiple rows in table may be used to determine the NZP CSI-RS resources indicated by the different values of the CRI.

When the NZP CSI-RS resource is unavailable for the CSI measurements under the different measurement assumptions, the number of the bits of the CRI is $\log_2(K-N)$ and the $\log_2(K-N)$ bits can indicate $K-N$ values of the CRI, where each of part of the values (for example, the smallest $K-2N$ values) of the CRI indicates a resource of $K-2N$ NZP CSI-RS resources for the CSI measurement under the measurement assumption of single TRP transmission, and each of another part of the values (for example, remaining N values) indicates a CMR pair in the N CMR pairs for the CSI measurement under the measurement assumption of NC-JT, as illustrated in table 2 below.

TABLE 2

| value of a CRI | NZP CSI-RS resource indicated |
|---|---|
| 0 | the first CMR for a CSI measurement under a measurement assumption of single TRP transmission |
| 1 | the second CMR for the CSI measurement under the measurement assumption of single TRP transmission |
| . . . | . . . |
| $K-2N-1$ | the $K-2N$ CMR for the CSI measurement under the measurement assumption of single TRP transmission |
| $K-2N$ | the first CMR pair for a CSI measurement under a measurement assumption of NC-JT |
| . . . | . . . |
| $K-N-1$ | the Nth CMR pair for the CSI measurement under the measurement assumption of NC-JT |

The foregoing table 2 is only an example. Contents of various rows in table 2 are independent of each other. In the present disclosure, any one row, two rows, or multiple rows in table 2 may be used to determine the NZP CSI-RS resources indicated by the different values of the CRI.

It is to be noted that, the foregoing manner is not limited to a case where the CSI contains merely one CRI, and may also be applied to a case where the CSI contain multiple CRIs. In the case where the CSI contains multiple CRIs, the number of bits of one CRI and NZP CSI-RS resources indicated by the one CRI can also be determined in the above manners.

In the case where the CSI contains two CRIs, one of the two CRIs may indicate a recommended CMR pair under the measurement assumption of NC-JT, and the other one of the two CRIs may indicate a recommended CMR under the measurement assumption of single TRP transmission.

In some implementations, in the case that the CSI contains two CRIs, determine the number of bits of each CRI in the CSI as follows. When the NZP CSI-RS resource is available for the CSI measurements under the different measurement assumptions, determine that the number of bits of a first CRI in the two CRIs is $\log_2(K)$, and the number of bits of a second CRI in the two CRIs is $\log_2(N)$; and/or when the NZP CSI-RS resource is unavailable for the CSI measurements under the different measurement assumptions, determine that the number of the bits of the first CRI in the two CRIs is $\log_2(K-2N)$, and the number of the bits of the second CRI in the two CRIs is $\log_2(N)$, where K represents the number of the NZP CSI-RS resources in the NZP CSI-RS resource set for channel measurements, and N represents the number of the CMR pairs for the CSI measurement under the measurement assumption of NC-JT in the NZP CSI-RS resource set for channel measurements.

In some implementations, in the case where the CSI contains two CRIs, determine NZP CSI-RS resources respectively indicated by different values of each of the CRIs in the CSI as follows. When the NZP CSI-RS resource is available for the CSI measurements under the different measurement assumptions, determine that each of different values of a first CRI in the two CRIs indicate a resource in K NZP CSI-RS resources in the NZP CSI-RS resource set for channel measurements, and determine that each of different values of a second CRI in the two CRIs indicate a CMR pair in the N CMR pairs for the CSI measurement under the measurement assumption of NC-JT; and/or when the NZP CSI-RS resource is unavailable for the CSI measurements under the different measurement assumptions, determine that each of the different values of the first CRI in the two CRIs indicate a resource in the $K-2N$ NZP CSI-RS resources for the CSI measurement under the measurement assumption of single TRP transmission, and determine that each of the different values of the second CRI in the two CRIs indicates a CMR pair in the N CMR pairs for the CSI measurement under the measurement assumption of NC-JT.

Specifically, when the NZP CSI-RS resource is available for the CSI measurements under the different measurement assumptions, the number of bits of a CRI (such as the first CRI) in the two CRIs is $\log_2(K)$ and the $\log_2(K)$ bits can indicate K values of the CRI, where each of different values of the CRI indicate a resource in the K NZP CSI-RS resources in the NZP CSI-RS resource set, as illustrated in table 3 below.

TABLE 3

| value of a first CRI | NZP CSI-RS resource indicated |
|---|---|
| 0 | the first CMR in a set |
| 1 | the second CMR in the set |
| . . . | . . . |
| $K-1$ | the Kth CMR in the set |

The foregoing table 3 is only an example. Contents of various rows in table 3 are independent of each other. In the present disclosure, any one row, two rows, or multiple rows in table 3 may be used to determine the NZP CSI-RS resources respectively indicated by the different values of the CRI.

When the NZP CSI-RS resource is unavailable for the CSI measurements under the different measurement assumptions, the number of bits of a CRI (such as the first CRI) in the two CRIs is $\log_2(K-2N)$ and the $\log_2(K-2N)$ bits can indicate $K-2N$ values of the CRI, where each of different values of the CRI indicates a resource in the $K-2N$ NZP CSI-RS resources for the CSI measurement under the measurement assumption of single TRP transmission, as illustrated in table 4 below.

TABLE 4

| value of a first CRI | NZP CSI-RS resource indicated |
|---|---|
| 0 | the first CMR for a CSI measurement under a measurement assumption of single TRP transmission |
| 1 | the second CMR for the CSI measurement under the measurement assumption of single TRP transmission |
| . . . | . . . |
| $K-2N-1$ | the $K-2N$th CMR for the CSI measurement under the measurement assumption of single TRP transmission |

The foregoing table 4 is only an example. Contents of various rows in table 4 are independent of each other. In the present disclosure, any one row, two rows, or multiple rows in table 4 can be used to determine the NZP CSI-RS resources respectively indicated by the different values of the first CRI.

No matter whether or not the NZP CSI-RS resource is available for the CSI measurements under the different measurement assumptions, the number of bits of a CRI (such as the second CRI) in the two CRIs is $\log_2(N)$ and the $\log_2(N)$ bits can indicate N values of the CRI, where each of different values of the CRI indicates a CMR pair in the N CMR pairs for the CSI measurement under the assumption measurement of NC-JT, as illustrated in table 5 below.

TABLE 5

| value of a second CRI | NZP CSI-RS resource indicated |
|---|---|
| 0 | the first CMR pair for a CSI measurement under a measurement assumption of NC-JT |
| . . . | . . . |
| $N-1$ | the Nth CMR pair for the CSI measurement under the measurement assumption of NC-JT |

The foregoing table 5 is merely an example. Contents of various rows in table 5 are independent of each other. In the present disclosure, any row, two rows, or multiple rows in table 5 may be used to determine NZP CSI-RS resources respectively indicated by different values of the second CRI.

It is to be noted that, the foregoing method is not limited to the case where the CSI contains two CRIs, and may also be applied to the case where the CSI contains other numbers of CRIs. In the case where the CSI contains other numbers of CRIs, the number of bits of at least one of the CRIs and NZP CSI-RS resources indicated by the at least one of the CRIs can be determined in the above manners.

In the case where the CSI contains three CRIs, a first CRI in the three CRIs may indicate a recommended CMR pair under the measurement assumption of NC-JT, a second CRI in the three CRIs may indicate a recommended CMR (an optimal CMR corresponding to one TRP) in the first CMR group in the above set under the measurement assumption of single TRP transmission, and a third CRI in the three CRIs may indicate a recommended CMR (an optimal CMR corresponding to another TRP) in the second CMR group in the above set under the measurement assumption of single TRP transmission.

In some implementations, in the case that the CSI contains three CRIs, determine the number of bits of each CRI in the CSI as follows. When the NZP CSI-RS resource is available for the CSI measurements under the different measurement assumptions, determine that the number of bits of a first CRI in the three CRIs is $\log_2(N)$, the number of bits of a second CRI in the three CRIs is $\log_2(K_1)$, and the number of bits of a third CRI in the three CRIs is $\log_2(K_2)$; and/or when the NZP CSI-RS resource is unavailable for the CSI measurements under the different measurement assumptions, determine that the number of the bits of the first CRI in the three CRIs is $\log_2(N)$, the number of the bits of the second CRI in the three CRIs is $\log_2(K_1-N)$, and the number of the bits of the third CRI in the three CRIs is $\log_2(K_2-N)$. K represents the number of the NZP CSI-RS resources in the NZP CSI-RS resource set for channel measurements, N represents the number of the CMR pairs for the CSI measurement under the measurement assumption of NC-JT in the NZP CSI-RS resource set for channel measurements, $K_1$ represents the number of NZP CSI-RS resources in the first CMR group in the NZP CSI-RS resource set, and $K_2$ represents the number of NZP CSI-RS resources in the second CMR group in the NZP CSI-RS resource set.

In some implementations, in the case where the CSI contains three CRIs, determine NZP CSI-RS resources respectively indicated by different values of each CRI in the CSI as follows. When the NZP CSI-RS resource is available for the CSI measurements under the different measurement assumptions, determine that each of different values of a first CRI in the three CRIs indicates a CMR pair in the N CMR pairs for the CSI measurement under the measurement assumption of NC-JT, determine that each of different values of a second CRI in the three CRIs indicates an NZP CSI-RS resource in the first CMR group in the NZP CSI-RS resource set for channel measurements, and determines that each of different values of a third CRI in the three CRIs indicates an NZP CSI-RS resource in the second CMR group in the NZP CSI-RS resource set for channel measurements; and/or when the NZP CSI-RS resource is unavailable for the CSI measurements under the different measurement assumptions, determine that each of the different values of the first CRI in the three CRIs indicates a CMR pair in the N CMR pairs for the CSI measurement under the measurement assumption of NC-JT, each of the different values of the second CRI in the three CRIs indicates a resource in $K_1-N$ NZP CSI-RS resources for the CSI measurement under the measurement assumption of single TRP transmission in the first CMR group in the NZP CSI-RS resource set for channel measurements, and each of the different values of the third CR in the three CRIs indicates a resource in $K_2-N$ NZP CSI-RS resources for the CSI measurement under the measurement assumption of single TRP transmission in the second CMR group in the NZP CSI-RS resource set for channel measurements.

Specifically, when the NZP CSI-RS resource is available for the CSI measurements under the different measurement assumptions, the number of the bits of the first CR in the three CRIs is $\log_2(N)$ and each of values of the first CR indicates a CMR pair in the N CMR pairs for the CSI measurement under the measurement assumption of NC-JT, the number of the bits of the second CRI is $\log_1(K_1)$ and each of values of the second CRI indicates an NZP CSI-RS resource in a CMR group, and the number of the bits of the third CRI is $\log_2(K_2)$ and each of values of the third CRI indicates an NZP CSI-RS resource in another CMR group, as illustrated in tables 6, 7 and 8 below.

TABLE 6

| value of a first CRI | NZP CSI-RS resource indicated |
|---|---|
| 0 | the first CMR pair for a CSI measurement under a measurement assumption of NC-JT |

TABLE 6-continued

| value of a first CRI | NZP CSI-RS resource indicated |
|---|---|
| 1 | the second CMR pair for the CSI measurement under the measurement assumption of NC-JT |
| . . . | . . . |
| N − 1 | the Nth CMR pair for the CSI measurement under the measurement assumption of NC-JT |

TABLE 7

| value of a second CRI | NZP CSI-RS resource indicated |
|---|---|
| 0 | the first CMR in a first CMR group |
| 1 | the second CMR in the first CMR group |
| . . . | . . . |
| $K_1 − 1$ | the $K_1$th CMR in the first CMR group |

TABLE 8

| value of a third CRI | NZP CSI-RS resource indicated |
|---|---|
| 0 | the first CMR in a second CMR group |
| 1 | the second CMR in the second CMR group |
| . . . | . . . |
| $K_2 − 1$ | the $K_2$th CMR in the second CMR group |

The above-mentioned tables 6, 7 and 8 are only examples. Contents of various rows in each of tables 6, 7 and 8 are independent of each other. In the present disclosure, any one,

TABLE 10

| value of a second CRI | NZP CSI-RS resource indicated |
|---|---|
| 0 | the first CMR for a CSI measurement under a measurement assumption of single TRP transmission in a first CMR group |
| 1 | the second CMR for the CSI measurement under the measurement assumption of single TRP transmission in the first CMR group |
| . . . | . . . |
| $K_1 − N − 1$ | the $K_1 − N$ th CMR for the CSI measurement under the measurement assumption of single TRP transmission in the first CMR group |

TABLE 11

| value of a third CRI | NZP CSI-RS resource indicated |
|---|---|
| 0 | the first CMR for a CSI measurement under a measurement assumption of single TRP transmission in a second CMR group |
| 1 | the second CMR for the CSI measurement under the measurement assumption of single TRP transmission in the second CMR group |
| . . . | . . . |
| $K_2 − N − 1$ | the $K_2 − N$ th CMR for the CSI measurement under the measurement assumption of single TRP transmission in the second CMR group |

The foregoing tables 9, 10, and 11 are only examples. Contents of various rows in each of tables 9, 10, and 11 are independent of each other. In the present disclosure, any row, two rows, or multiple rows in table 9, 10, or 11 may be used to determine NZP CSI-RS resources respectively indicated by different values of each CRI.

It is to be noted that the foregoing method is not limited to the case where the CSI contains three CRIs, and may also two or more rows in table 6, 7, or 8 can be used to determine NZP CSI-RS resources respectively indicated by different values of each CRI.

When the NZP CSI-RS resource is unavailable for the CSI measurements under the different measurement assumptions, the number of the bits of the first CR in the three CRIs is $\log_2(N)$ and each of values of the first CRI can indicate a CMR pair in the N CMR pairs for the CSI measurement under the measurement assumption of NC-JT, the number of the bits of the second CRI is $\log_2(K_1−N)$ and each of values of the second CRI can indicate a resource in $K_1−N$ NZP CSI-RS resources for the CSI measurement under the measurement assumption of single TRP transmission in a CMR group, and the number of the bits of the third CR is $\log_2(K_2−N)$ and each of values of the third CRI can indicate a resource in $K_2−N$ NZP CSI-RS resources for the CSI measurement under the measurement assumption of a single TRP transmission in another CMR group, as illustrated in tables 9, 10, and 11 below.

TABLE 9

| value of a first CRI | NZP CSI-RS resource indicated |
|---|---|
| 0 | the first CMR pair for a CSI measurement under a measurement assumption of NC-JT |
| 1 | the second CMR pair for the CSI measurement under the measurement assumption of NC-JT |
| . . . | . . . |
| N − 1 | the Nth CMR pair for the CSI measurement under the measurement assumption of NC-JT | be applied to the case where the CSI includes other numbers of CRIs. In this case, the number of bits of each of two CRIs in the CSI and NZP CSI-RS resources indicated by each of the two CRIs can be determined in the above manners.

In some implementations, the method for determining CSI provided by the present disclosure can further include the following. The terminal device determines, according to whether the NZP CSI-RS resource is available for the CSI measurements under the different measurement assumptions, whether a CSI-interference measurement (CSI-IM) resource is available for IMs under the different measurement assumptions or a CSI-IM resource for the IMs under the different measurement assumptions. For example, when an NZP CSI-RS resource is available for both the CSI measurement under the measurement assumption of single TRP transmission and the CSI measurement under the measurement assumption of NC-JT, the terminal device determines that a CSI-IM resource is also available for both an IM under the measurement assumption of single TRP transmission and an IM under the measurement assumption of NC-JT. When an NZP CSI-RS resource is unavailable for both the CSI measurement under the measurement assumption of single TRP transmission and the CSI measurement under the measurement assumption of NC-JT, the terminal device determines that a CSI-IM resource is also unavailable for both the IM under the measurement assumption of single TRP transmission and the IM under the measurement assumption of NC-JT.

In another implementation, the terminal device determines, according to whether the NZP CSI-RS resource is available for the CSI measurements under the different measurement assumptions, a corresponding CSI-IM resource for the IMs under the different measurement assumptions.

For example, when an NZP CSI-RS resource is available for both the CSI measurement under the measurement assumption of single TRP transmission and the CSI measurement under the measurement assumption of NC-JT, K CMRs in the NZP CSI-RS resource set correspond to K CSI-IM resources respectively (may be in a one-to-one mapping relation). The K CMRs can be used for the channel measurement under the measurement assumption of single TRP transmission, and the K CSI-IM resources can be used for the IM under the measurement assumption of single TRP transmission. In addition, the N CMR pairs also correspond to N CSI-IM resources respectively, where the N CMR pairs can be used for the channel measurement under the measurement assumption of NC-JT, and the N CSI-IM resources can be used for the IM under the measurement assumption of NC-JT.

For another example, when an NZP CSI-RS resource is unavailable for both the CSI measurement under the measurement assumption of single TRP transmission and the CSI measurement under the measurement assumption of NC-JT, K CMRs in the NZP CSI-RS resource set correspond to K CSI-IM resources respectively (may be in a one-to-one mapping relation). Two CMRs in each CMR pair in the N CMR pairs correspond to the same CSI-IM resource, where the two CMRs in each CMR pair can be used for the channel measurement under the measurement assumption of NC-JT, and the corresponding CSI-IM resource can be used for the IM under the measurement assumption of NC-JT. In addition, K−2N CMRs can be used for the channel measurement under the measurement assumption of single TRP transmission, and corresponding K−2N CSI-IM resources can be used for the IM under the measurement assumption of single TRP transmission. In this case, the network device does not need to further configure N CSI-IM resources for the IM under the measurement assumption of NC-JT.

After determining the CRI in the manner described above, the terminal device can send CSI containing the CRI to the network device. Since the terminal device can determine, according to whether the same NZP CSI-RS resource can be reused under the different measurement assumptions, the least number of bits for feeding back a corresponding CRI, and thus the number of bits of the CRI can be reduced as much as possible, and CSI required for DL multi-TRP joint transmission can be fed back by using the CRI with the least number of bits, thereby improving the efficiency of UL transmission.

In addition, when the terminal device reports the CSI, the CSI may contain the foregoing CRI and contents obtained based on the CRI such as an RI, a PMI, and a CQI.

Implementations of the present disclosure further provide another method for determining CSI. FIG. 5 is a schematic flow chart of another method for determining CSI according to implementations of the present disclosure. The method can optionally be applied to the system illustrated in FIG. 1 to FIG. 3, but is not limited thereto. The method includes at least part of the following.

In S510, a network device determines, according to whether an NZP CSI-RS resource is available for CSI measurements under different measurement assumptions, the number of bits of a CRI in CSI and/or NZP CSI-RS resources respectively indicated by different values of the CRI.

Optionally, the different measurement assumptions include a measurement assumption of single TRP transmission and a measurement assumption of NC-JT.

Optionally, the CSI measurements under the different measurement assumptions include a single CMR-based CSI measurement and a single CMR pair-based CSI measurement.

Optionally, the network device determines whether the NZP CSI-RS resource is available for the CSI measurement under the different measurement assumptions, according to whether the CSI measurement is performed on a carrier of an FR1 or on a carrier of an FR2 or according to whether the NZP CSI-RS resource is configured on the carrier of the FR1 or on the carrier of the FR2.

Optionally, the network device determines whether the NZP CSI-RS resource is available for the CSI measurements under the different measurement assumptions according to terminal-capability report information. The terminal-capability report information indicates whether an NZP CSI-RS resource for a CSI measurement under the measurement assumption of single TRP transmission is available for a CSI measurement under the measurement assumption of NC-JT. Alternatively, the terminal-capability report information indicates whether an NZP CSI-RS resource for the single CMR-based CSI measurement is available for the single CMR pair-based CSI measurement.

Optionally, determine the number of the bits of the CRI in the CSI as follows. When the NZP CSI-RS resource is available for the CSI measurements under the different measurement assumptions, determine that the number of the bits of the CRI is $\log_2(K+N)$; and/or when the NZP CSI-RS resource is unavailable for the CSI measurements under the different measurement assumptions, determine that the number of the bits of the CRI is $\log_2(K−N)$. K represents the number of NZP CSI-RS resources in an NZP CSI-RS resource set for channel measurements, and N represents the number of CMR pairs for the CSI measurement under the measurement assumption of NC-JT in an NZP CSI-RS resource set for channel measurements.

Optionally, determine the NZP CSI-RS resources respectively indicated by the different values of the CRI in the CSI as follows. When the NZP CSI-RS resource is available for the CSI measurements under the different measurement assumptions, determine that each of part of the values of the CRI indicates a resource in K NZP CSI-RS resources in the NZP CSI-RS resource set for channel measurements, and each of remaining part of the values of the CRI indicates a CMR pair in N CMR pairs for the CSI measurement under the measurement assumption of NC-JT; and/or when the NZP CSI-RS resource is unavailable for the CSI measurements under the different measurement assumptions, determine that each of part of the values of the CRI indicates a resource in $K–2N$ NZP CSI-RS resources for the CSI measurement under the measurement assumption of single TRP transmission, and each of remaining part of the values of the CRI indicates a CMR pair in the N CMR pairs for the CSI measurement under the measurement assumption of NC-JT.

Optionally, determine the number of the bits of the CRI in the CSI as follows. When the NZP CSI-RS resource is available for the CSI measurements under the different measurement assumptions, determine that the number of bits of a first CRI in the CSI is $\log_2(K)$ and the number of bits of a second CRI in the CSI is $\log_2(N)$; and/or when the NZP CSI-RS resource is unavailable for the CSI measurements under the different measurement assumptions, determine that the number of the bits of the first CRI in the CSI is $\log_2(K–2N)$ and the number of the bits of the second CRI in the CSI is $\log_2(N)$. K represents the number of the NZP CSI-RS resources in the NZP CSI-RS resource set for channel measurements, and N represents the number of the CMR pairs for the CSI measurement under the measurement assumption of NC-JT in the NZP CSI-RS resource set for channel measurements.

Optionally, determine the NZP CSI-RS resources respectively indicated by the different values of the CRI in the CSI as follows. When the NZP CSI-RS resource is available for the CSI measurements under the different measurement assumptions, determine that each of different values of a first CRI in the CSI indicates a resource in the K NZP CSI-RS resources in the NZP CSI-RS resource set for channel measurements, and each of different values of a second CRI in the CSI indicates a CMR pair in the N CMR pairs for the CSI measurement under the measurement assumption of NC-JT; and/or when the NZP CSI-RS resource is unavailable for the CSI measurements under the different measurement assumptions, determine that each of the different values of the first CRI in the CSI indicates a resource in $K–2N$ NZP CSI-RS resources for the CSI measurement under the measurement assumption of single TRP transmission, and each of the different values of the second CRI in the CSI indicates a CMR pair in the N CMR pairs for the CSI measurement under the measurement assumption of NC-JT. K represents the number of the NZP CSI-RS resources in the NZP CSI-RS resource set for channel measurements, and N represents the number of the CMR pairs for the CSI measurement under the measurement assumption of NC-JT in the NZP CSI-RS resource set for channel measurements.

Optionally, determine the number of the bits of the CRI in the CSI as follows. When the NZP CSI-RS resource is available for the CSI measurements under the different measurement assumptions, determine that the number of bits of a first CRI in the CSI is $\log_2(N)$, the number of bits of a second CRI in the CSI is $\log_2(K_1)$, and the number of bits of a third CRI in the CSI is $\log_2(K_1)$; and/or when the NZP CSI-RS resource is unavailable for the CSI measurements under the different measurement assumptions, determine that the number of the bits of the first CRI in the CSI is $\log_2(N)$, the number of the bits of the second CRI in the CSI is $\log_2(K_1–N)$, and the number of the bits of the third CRI in the CSI is $\log_2(K_2–N)$. K represents the number of the NZP CSI-RS resources in the NZP CSI-RS resource set for channel measurements, N represents the number of the CMR pairs for the CSI measurement under the measurement assumption of NC-JT in the NZP CSI-RS resource set for channel measurements, $K_1$ represents the number of NZP CSI-RS resources in a first CMR group in the NZP CSI-RS resource set, and $K_2$ represents the number of NZP CSI-RS resources in a second CMR group in the NZP CSI-RS resource set.

Optionally, determine the NZP CSI-RS resources respectively indicated by the different values of the CRI in the CSI as follows. When the NZP CSI-RS resource is available for the CSI measurements under the different measurement assumptions, determine that each of different values of a first CRI in the CSI indicates a CMR pair in the N CMR pairs for the CSI measurement under the measurement assumption of NC-JT, each of different values of a second CRI in the CSI indicates an NZP CSI-RS resource in the first CMR group in the NZP CSI-RS resource set for channel measurements, and each of different values of a third CRI in the CSI indicates an NZP CSI-RS resource in the second CMR group in the NZP CSI-RS resource set for channel measurements; and/or when the NZP CSI-RS resource is unavailable for the CSI measurements under the different measurement assumptions, determine that each of the different values of the first CRI in the CSI indicates a CMR pair in the N CMR pairs for the CSI measurement under the measurement assumption of NC-JT, each of the different values of the second CRI in the CSI indicates a resource in $K_1 – N$ NZP CSI-RS resources for the CSI measurement under the measurement assumption of single TRP transmission in the first CMR group in the NZP CSI-RS resource set for channel measurements, and each of the different values of the third CRI in the CSI indicates a resource in $K_2–$ N NZP CSI-RS resources for the CSI measurement under the measurement assumption of single TRP transmission in the second CMR group in the NZP CSI-RS resource set for channel measurements. K represents the number of the NZP CSI-RS resources in the NZP CSI-RS resource set for channel measurements, N represents the number of the CMR pairs for the CSI measurement under the measurement assumption of NC-JT in the NZP CSI-RS resource set for channel measurement, $K_1$ represents the number of the NZP CSI-RS resources in the first CMR group in the NZP CSI-RS resource set, and $K_2$ represents the number of the NZP CSI-RS resources in the second CMR group in the NZP CSI-RS resource set.

Optionally, the method further includes the following. The network device determines, according to whether the NZP CSI-RS resource is available for the CSI measurements under the different measurement assumptions, whether a CSI-IM resource is available for IMs under the different measurement assumptions or a CSI-IM resource for the IMs under the different measurement assumptions.

Optionally, the method further includes the following. The network device obtains the CRI in the CSI according to the determined number of the bits of the CRI, and/or determines an NZP CSI-RS resource indicated by the CRI in the CSI according to the NZP CSI-RS resources respectively indicated by the different values of the CRI.

Optionally, the method further includes the following. The network device configures for the terminal device the NZP CSI-RS resource set for channel measurements. The NZP CSI-RS resource set includes the first CMR group and the second CMR group, and the NZP CSI-RS resource set includes at least one CMR pair for the CSI measurement under the measurement assumption of NC-JT, where each CMR pair includes one CMR in the first CMR group and one CMR in the second CMR group.

Optionally, the method further includes the following. The network device receives the CSI containing the CRI.

With the implementations of the disclosure, the network device can determine, according to whether a same NZP CSI-RS resource can be reused under different measurement assumptions, the number of the bits of the CRI in the CSI and/or the NZP CSI-RS resources respectively indicated by the different values of the CRI, and thus the network device can determine the NZP CSI-RS resource indicated by the CRI in the CSI reported by the terminal device. In this manner, the number of the bits of the CRI reported by the terminal device can be reduced as much as possible, thereby improving the efficiency of UL transmission.

The implementations of the present disclosure further provide a terminal device. FIG. 6 is a schematic structural diagram of a terminal device according to implementations of the present disclosure. The terminal device includes a first determining module 610 configured to determine, according to whether an NZP CSI-RS resource is available for CSI measurements under different measurement assumptions, the number of bits of a CRI in CSI and/or NZP CSI-RS resources respectively indicated by different values of the CRI in the CSI.

Optionally, the different measurement assumptions include a measurement assumption of single TRP transmission and a measurement assumption of NC-JT.

Optionally, the CSI measurements under the different measurement assumptions include a single CMR-based CSI measurement and a single CMR pair-based CSI measurement.

Optionally, the first determining module 610 is configured to determine whether the NZP CSI-RS resource is available for the CSI measurements under the different measurement assumptions according to first higher-layer signaling, where the first high-layer higher-layer signaling indicates whether an NZP CSI-RS resource for a CSI measurement under a measurement assumption of single TRP transmission is available for a CSI measurement under a measurement assumption of NC-JT; or the first higher-layer signaling indicates whether an NZP CSI-RS resource for the single CMR-based CSI measurement is available for the single CMR pair-based CSI measurement.

Optionally, the first determining module 610 is configured to determine whether the NZP CSI-RS resource is available for the CSI measurements under the different measurement assumptions, according to whether the CSI measurement is performed on a carrier of an FR1 or on a carrier of an FR2 or according to whether the NZP CSI-RS resource is configured on the carrier of the FR1 or on the carrier of the FR2.

Optionally, the first determining module 610 is configured to determine whether the NZP CSI-RS resource is available for the CSI measurements under the different measurement assumptions according to terminal-capability report information, where the terminal-capability report information indicates whether an NZP CSI-RS resource for the CSI measurement under the measurement assumption of single TRP transmission is available for the CSI measurement under the measurement assumption of NC-JT; or the terminal-capability report information indicates whether an NZP CSI-RS resource for the single CMR-based CSI measurement is available for the single CMR pair-based CSI measurement.

Optionally, the first determining module 610 configured to determine the number of the bits of the CRI in the CSI is configured to determine that the number of the bits of the CRI is $\log_2(K+N)$ when the NZP CSI-RS resource is available for the CSI measurements under the different measurement assumptions, and/or determine that the number of the bits of the CRI is $\log_2(K-N)$ when the NZP CSI-RS resource is unavailable for the CSI measurements under the different measurement assumptions, where K represents the number of NZP CSI-RS resources in an NZP CSI-RS resource set for channel measurements, and N represents the number of CMR pairs for the CSI measurement under the measurement assumption of NC-JT in the NZP CSI-RS resource set for channel measurements.

Optionally, the first determining module 610 configured to determine the NZP CSI-RS resources respectively indicated by the different values of the CRI in the CSI is configured to determine, when the NZP CSI-RS resource is available for the CSI measurements under the different measurement assumptions, that each of part of the values of the CRI indicates a resource in K NZP CSI-RS resources in the NZP CSI-RS resource set for channel measurements, and each of remaining part of the values of the CRI indicates a CMR pair in N CMR pairs for the CSI measurement under the measurement assumption of NC-JT; and/or determine, when the NZP CSI-RS resource is unavailable for the CSI measurements under the different measurement assumptions, that each of part of the values of the CRI indicates a resource in K−2N NZP CSI-RS resources for the CSI measurement under the measurement assumption of single TRP transmission, and each of remaining part of the values of the CRI indicates a CMR pair in the N CMR pairs for the CSI measurement under the measurement assumption of NC-JT.

Optionally, the first determining module 610 configured to determine the number of the bits of the CRI in the CSI is configured to determine, when the NZP CSI-RS resource is available for the CSI measurements under the different measurement assumptions, that the number of bits of a first CRI in the CSI is $\log_2(K)$, and the number of bits of a second CRI in the CSI is $\log_2(N)$, and/or determine, when the NZP CSI-RS resource is unavailable for the CSI measurements under the different measurement assumptions, that the number of the bits of the first CRI in the CSI is $\log_2(K-2N)$, and the number of the bits of the second CRI in the CSI is $\log_2(N)$, where K represents the number of NZP CSI-RS resources in the NZP CSI-RS resource set for channel measurements, and N represents the number of the CMR pairs for the CSI measurement under the measurement assumption of NC-JT in the NZP CSI-RS resource set for channel measurements.

Optionally, the first determining module 610 configured to determine the NZP CSI-RS resources respectively indicated by the different values of the CRI in the CSI is configured to determine, when the NZP CSI-RS resource is available for the CSI measurements under the different measurement assumptions, that each of different values of a first CRI in the CSI indicates a resource in K NZP CSI-RS resources in the NZP CSI-RS resource set for channel measurements, and each of different values of a second CRI in the CSI indicates a CMR pair in N CMR pairs for the CSI measurement under the measurement assumption of NC-JT; and/or determine, when the NZP CSI-RS resource is unavailable for the CSI measurements under the different measurement assumptions, that each of the different values of the first CRI in the CSI indicates a resource in K−2N NZP CSI-RS resources for the CSI measurement under the measurement assumption of single TRP transmission, and each of the different values of the second CRI in the CSI indicates a CMR pair in the N CMR pairs for the CSI measurement under the measurement assumption of NC-JT, where K represents the number of the NZP CSI-RS resources in the NZP CSI-RS resource set for channel measurements, and N represents the number of the CMR pairs for the CSI measurement under the measurement assumption of NC-JT in the NZP CSI-RS resource set for channel measurements.

Optionally, the first determining module 610 configured to determine the number of the bits of the CRI in the CSI is configured to determine, when the NZP CSI-RS resource is available for the CSI measurements under the different measurement assumptions, that the number of bits of a first CRI in the CSI is $\log_1(N)$, the number of bits of a second CRI in the CSI is $\log_2(K_1)$, and the number of bits of a third CRI in the CSI is $\log_2(K_2)$; and/or determine, when the NZP CSI-RS resource is unavailable for the CSI measurements under the different measurement assumptions, the number of the bits of the first CRI in the CSI is $\log_2(N)$, the number of the bits of the second CRI in the CSI is $\log_2(K_1-N)$, and the number of the bits of the third CRI in the CSI is $\log_2(K_1-N)$, where K represents the number of the NZP CSI-RS resources in the NZP CSI-RS resource set for channel measurements, N represents the number of the CMR pairs for the CSI measurement under the measurement assumption of NC-JT in the NZP CSI-RS resource set for channel measurements, $K_1$ represents the number of NZP CSI-RS resources in a first CMR group in the NZP CSI-RS resource set, and $K_2$ represents the number of NZP CSI-RS resources in a second CMR group in the NZP CSI-RS resource set.

Optionally, the first determining module configured to determine the NZP CSI-RS resources respectively indicated by the different values of the CRI in the CSI is configured to determine, when the NZP CSI-RS resource is available for the CSI measurements under the different measurement assumptions, that each of different values of a first CRI in the CSI indicates a CMR pair in N CMR pairs for the CSI measurement under the measurement assumption of NC-JT, each of different values of a second CRI in the CSI indicates an NZP CSI-RS resource in the first CMR group in the NZP CSI-RS resource set for channel measurements, and each of different values of a third CRI in the CSI indicates an NZP CSI-RS resource in the second CMR group in the NZP CSI-RS resource set for channel measurements; and/or determine, when the NZP CSI-RS resource is unavailable for the CSI measurements under the different measurement assumptions, that each of the different values of the first CRI in the CSI indicates a CMR pair in the N CMR pairs for the CSI measurement under the measurement assumption of NC-JT, each of the different values of the second CRI in the CSI indicates a resource in $K_1-N$ NZP CSI-RS resources for the CSI measurement under the measurement assumption of single TRP transmission in the first CMR group in the NZP CSI-RS resource set for channel measurements, and each of the different values of the third CRI in the CSI indicates a resource in $K_2-N$ NZP CSI-RS resources for the CSI measurement under the measurement assumption of single TRP transmission in the second CMR group in the NZP CSI-RS resource set for channel measurements, where K represents the number of NZP CSI-RS resources in the NZP CSI-RS resource set for channel measurements, N represents the number of CMR pairs for the CSI measurement under the measurement assumption of NC-JT in the NZP CSI-RS resource set for channel measurements, $K_1$ represents the number of NZP CSI-RS resources in the first CMR group in the NZP CSI-RS resource set, and $K_2$ represents the number of NZP CSI-RS resources in the second CMR group in the NZP CSI-RS resource set.

Implementations of the present disclosure further provides a terminal device. FIG. 7 is another schematic structural diagram of a terminal device according to implementations of the present disclosure. The terminal device includes the first determining module 610 and a second determining module 720. The second determining module 720 is configured to determine, according to whether the NZP CSI-RS resource is available for the CSI measurements under the different measurement assumptions, whether a CSI-IM resource is available for IMs under the different measurement assumptions or a CSI-IM resource for the IMs under the different measurement assumptions.

Optionally, as illustrated in FIG. 7, the terminal device may further include a first receiving module 730 configured to receive an NZP CSI-RS resource set for channel measurements configured by a network device, where the NZP CSI-RS resource set includes a first CMR group and a second CMR group, the NZP CSI-RS resource set includes at least one CMR pair for a CSI measurement under a measurement assumption of NC-JT, and each of the at least one CMR pair includes a CMR in the first CMR group and a CMR in the second CMR group.

Optionally, as illustrated in FIG. 7, the terminal device may further include a sending module 740 configured to send the CSI containing the CRI.

It is to be understood that the above and other operations and/or functions of the modules of the terminal device in the implementations of the present disclosure are used for realizing corresponding processes performed by the terminal device in the method as illustrated in FIG. 4, which will not be repeated herein for brevity.

Figure 8:
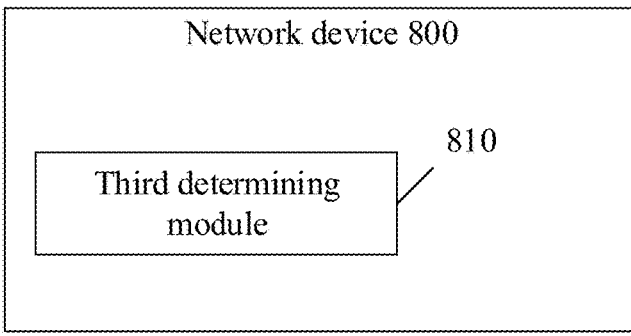
FIG. 8 is a schematic structural diagram of a network device according to implementations of the present disclosure.

Implementations of the present disclosure further provide a network device. FIG. 8 is a schematic structural diagram of a network device according to implementations of the present disclosure. The network device includes a third determining module 810 configured to determine, according to whether an NZP CSI-RS resource is available for CSI measurements under different measurement assumptions, the number of bits of a CRI in CSI and/or NZP CSI-RS resources respectively indicated by different values of the CRI in the CSI.

Optionally, the different measurement assumptions include a measurement assumption of single TRP transmission and a measurement assumption of NC-JT.

Optionally, the CSI measurements under the different measurement assumptions include a single CMR-based CSI measurement and a single CMR pair-based CSI measurement.

Optionally, the third determining module 810 is configured to determine whether the NZP CSI-RS resource is available for the CSI measurements under the different measurement assumptions, according to whether the CSI measurement is performed on a carrier of an FR1 or on a carrier of an FR2 or according to whether the NZP CSI-RS resource is configured on the carrier of the FR1 or on the carrier of the FR2.

Optionally, the third determining module 810 is configured to determine whether the NZP CSI-RS resource is available for the CSI measurements under the different measurement assumptions according to terminal-capability report information, where the terminal-capability report information indicates whether an NZP CSI-RS resource for the CSI measurement under the measurement assumption of single TRP transmission is available for the CSI measurement under the measurement assumption of NC-JT; or the terminal-capability report information indicates whether an NZP CSI-RS resource for the single CMR-based CSI measurement is available for the single CMR pair-based CSI measurement.

Optionally, the third determining module 810 configured to determine the number of the bits of the CRI in the CSI is configured to determine that the number of the bits of the CRI is $\log_2(K+N)$ when the NZP CSI-RS resource is available for the CSI measurements under the different measurement assumptions; and/or determine that the number of the bits of the CRI is $\log_2(K-N)$ when the NZP CSI-RS resource is unavailable for the CSI measurements under the different measurement assumptions, where K represents the number of NZP CSI-RS resources in an NZP CSI-RS resource set for channel measurements, and N represents the number of CMR pairs for the CSI measurement under the measurement assumption of NC-JT in the NZP CSI-RS resource set for channel measurements.

Optionally, the third determining module 810 configured to determine the NZP CSI-RS resources respectively indicated by the different values of the CRI in the CSI is configured to determine, when the NZP CSI-RS resource is available for the CSI measurements under the different measurement assumptions, that each of part of the values of the CRI indicates a resource in K NZP CSI-RS resources in the NZP CSI-RS resource set for channel measurements, and each of remaining part of the values of the CRI indicates a CMR pair in N CMR pairs for the CSI measurement under the measurement assumption of NC-JT; and/or determine, when the NZP CSI-RS resource is unavailable for the CSI measurements under the different measurement assumptions, that each of part of the values of the CRI indicates a resource in K−2N NZP CSI-RS resources for the CSI measurement under the measurement assumption of single TRP transmission, and each of remaining part of the values of the CRI indicates a CMR pair in the N CMR pairs for the CSI measurement under the measurement assumption of NC-JT.

Optionally, the third determining module 810 configured to determine the number of the bits of the CRI in the CSI is configured to determine, when the NZP CSI-RS resource is available for the CSI measurements under the different measurement assumptions, that the number of bits of a first CRI in the CSI is $\log_2(K)$ and the number of bits of a second CRI in the CSI is $\log_2(N)$; and/or determine, when the NZP CSI-RS resource is unavailable for the CSI measurements under the different measurement assumptions, that the number of the bits of the first CRI in the CSI is $\log_2(K-2N)$ and the number of the bits of the second CRI in the CSI is $\log_2(N)$, where K represents the number of the NZP CSI-RS resources in the NZP CSI-RS resource set for channel measurements, and N represents the number of the CMR pairs for the CSI measurement under the measurement assumption of NC-JT in the NZP CSI-RS resource set for channel measurements.

Optionally, the third determining module 810 configured to determine the NZP CSI-RS resources respectively indicated by the different values of the CRI in the CSI is configured to determine, when the NZP CSI-RS resource is available for the CSI measurements under the different measurement assumptions, that each of different values of a first CRI in the CSI indicates a resource in K NZP CSI-RS resources in the NZP CSI-RS resource set for channel measurements, and each of different values of a second CRI in the CSI indicates a CMR pair in the N CMR pairs for the CSI measurement under the measurement assumption of NC-JT; and/or determine, when the NZP CSI-RS resource is unavailable for the CSI measurements under the different measurement assumptions, that each of the different values of the first CRI in the CSI indicates a resource in K−2N NZP CSI-RS resources for the CSI measurement under the measurement assumption of single TRP transmission, and each of the different values of the second CRI in the CSI indicates a CMR pair in the N CMR pairs for the CSI measurement under the measurement assumption of NC-JT, where K represents the number of NZP CSI-RS resources in the NZP CSI-RS resource set for channel measurements, and N represents the number of CMR pairs for the CSI measurement under the measurement assumption of NC-JT in the NZP CSI-RS resource set for channel measurements.

Optionally, the third determining module 810 configured to determine the number of the bits of the CRI in the CSI is configured to determine, when the NZP CSI-RS resource is available for the CSI measurements under the different measurement assumptions, that the number of bits of a first CRI in the CSI is $\log_2(N)$, the number of bits of a second CRI in the CSI is $\log_2(K_1)$, and the number of bits of a third CRI in the CSI is $\log_2(K_2)$; and/or determine, when the NZP CSI-RS resource is unavailable for the CSI measurements under the different measurement assumptions, that the number of the bits of the first CRI in the CSI is $\log_2(N)$, the number of the bits of the second CRI in the CSI is $\log_2(K_1-N)$, and the number of bits of the third CRI in the CSI is $\log_2(K_2-N)$, where K represents the number of NZP CSI-RS resources in the NZP CSI-RS resource set for channel measurements, N represents the number of the CMR pairs for the CSI measurement under the measurement assumption of NC-JT in the NZP CSI-RS resource set for channel measurements, $K_1$ represents the number of NZP CSI-RS resources in a first CMR group in the NZP CSI-RS resource set, and $K_2$ represents the number of NZP CSI-RS resources in a second CMR group in the NZP CSI-RS resource set.

Optionally, the third determining module 810 configured to determine the NZP CSI-RS resources respectively indicated by the different values of the CRI in the CSI is configured to determine, when the NZP CSI-RS resource is available for the CSI measurements under the different measurement assumptions, that each of different values of a first CRI in the CSI indicates a CMR pair in N CMR pairs for the CSI measurement under the measurement assumption of NC-JT, each of different values of a second CRI in the CSI indicates an NZP CSI-RS resource in the first CMR group in the NZP CSI-RS resource set for channel measurements, and each of different values of a third CRI in the CSI indicates an NZP CSI-RS resource in the second CMR group in the NZP CSI-RS resource set for channel measurements; and/or determine, when the NZP CSI-RS resource is unavailable for the CSI measurements under the different measurement assumptions, that each of the different values of the first CRI in the CSI indicates a CMR pair in the N CMR pairs for the CSI measurement under the measurement assumption of NC-JT, each of the different values of the second CRI in the CSI indicates a resource in $K_1-N$ NZP CSI-RS resources for the CSI measurement under the measurement assumption of single TRP transmission in the first CMR group in the NZP CSI-RS resource set for channel measurements, and each of the different values of the third CRI in the CSI indicates a resource in $K_2-N$ NZP CSI-RS resources for the CSI measurement under the measurement assumption of single TRP transmission in the second CMR group in the NZP CSI-RS resource set for channel measurements, where K represents the number of the NZP CSI-RS resources in the NZP CSI-RS resource set for channel measurements, N represents the number of the CMR pairs for the CSI measurement under the measurement assumption of NC-JT in the NZP CSI-RS resource set for channel measurements, $K_1$ represents the number of the NZP CSI-RS resources in the first CMR group in the NZP CSI-RS resource set, and $K_2$ represents the number of the NZP CSI-RS resources in the second CMR group in the NZP CSI-RS resource set.

Figure 9:
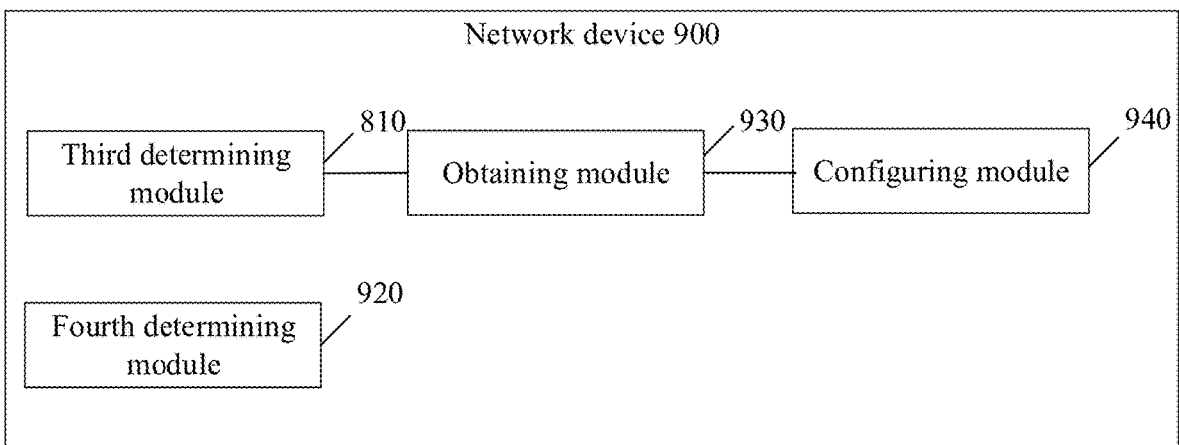
FIG. 9 is another schematic structural diagram of a network device according to implementations of the present disclosure.

Implementations of the present disclosure further provide a network device. FIG. 9 is a schematic structural diagram of a network device according to implementations of the present disclosure. The network device includes the third determining module 810 and a fourth determining module 920. The fourth determining module 920 is configured to determine, according to whether the NZP CSI-RS resource is available for the CSI measurements under the different measurement assumptions, whether a CSI-IM resource is available for IMs under the different measurement assumptions or a CSI-IM resource for the IMs under the different measurement assumptions.

Optionally, as illustrated in FIG. 9, the network device may further include an obtaining module 930 configured to obtain the CRI in the CSI according to the number of the bits of the CRI, and/or determine an NZP CSI-RS resource indicated by the CRI in the CSI according to the NZP CSI-RS resources respectively indicated by the different values of the CRI.

Optionally, as illustrated in FIG. 9, the network device may further include a configuring module 940 configured to configure for a terminal device an NZP CSI-RS resource set for channel measurements, where the NZP CSI-RS resource set includes a first CMR group and a second CMR group, the NZP CSI-RS resource set includes at least one CMR pair for a CSI measurement under a measurement assumption of NC-JT, and each of the at least one CMR pair includes a CMR in the first CMR group and a CMR in the second CMR group.

It is to be understood that the above and other operations and/or functions of the modules of the network device in the implementations of the present disclosure are used for realizing corresponding procedures performed by the network device in the method as illustrated in FIG. 5, which will not be repeated herein for brevity.

It is to be noted that, the functions of various modules (sub-modules, units, or components) of the terminal device 600, the terminal device 700, the network device 800, and the network device 900 in the implementations of the present disclosure may be implemented by different modules (sub-modules, units, or components, etc.), or may also be implemented by the same module (a sub-module, a unit, or a component, etc.). For example, the first determining module and the second determining module may be different modules or the same module that can achieve the corresponding functions in the implementations of the present disclosure. In addition, the sending module and the receiving module in the implementations of the present disclosure can be realized by a transceiver of a device, and some or all of the other modules can be realized by a processor of the device.

Figure 10:
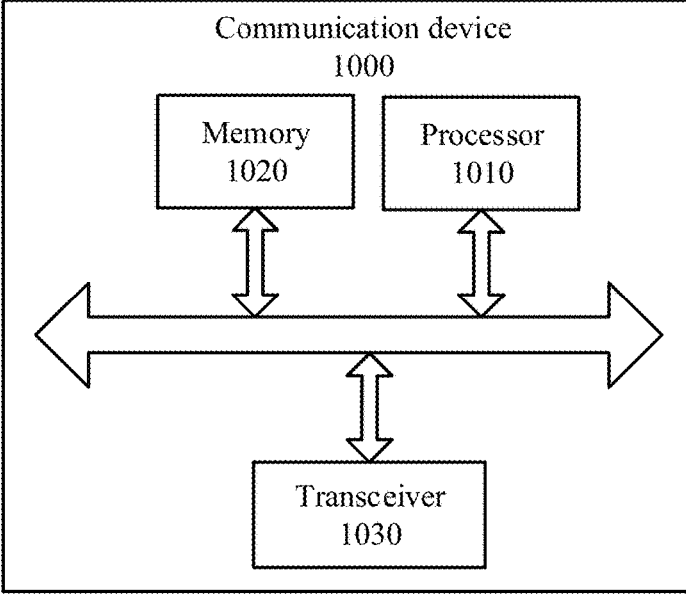
FIG. 10 is a schematic structural diagram of a communication device 1000 according to implementations of the present disclosure.

FIG. 10 is a schematic structural diagram of a communication device 1000 according to implementations of the present disclosure. The communication device 1000 illustrated in FIG. 10 includes a processor 1010. The processor 1010 may invoke and run a computer program in a memory, so as to implement the methods in the implementations of the present disclosure.

Optionally, as illustrated in FIG. 10, the communication device 1000 can further include a memory 1020. The processor 1010 can call and run a computer program in the memory 1020 to implement the method in the implementations of the present disclosure.

The memory 1020 may be independent of the processor 1010, or may be integrated in the processor 1010.

Optionally, as illustrated in FIG. 10, the communication device 1000 can further include a transceiver 1030. The processor 1010 can control the transceiver 1030 to communicate with other devices, and specifically, can send information or data to other devices, or receive information or data sent by other devices.

The transceiver 1030 can include a transmitter and a receiver. The transceiver 1030 can further include one or more antennas.

Optionally, the communication device 1000 may be the terminal device of the implementations of the present disclosure, and the communication device 1000 may implement corresponding processes implemented by the terminal device in various methods of the implementations of the present disclosure, which are not described herein again for conciseness.

Optionally, the communication device 1000 may be the network device of the implementations of the present disclosure, and the communication device 1000 may implement corresponding processes implemented by the network device in various methods of the implementations of the present disclosure, which are not described herein again for conciseness.

Figure 11:
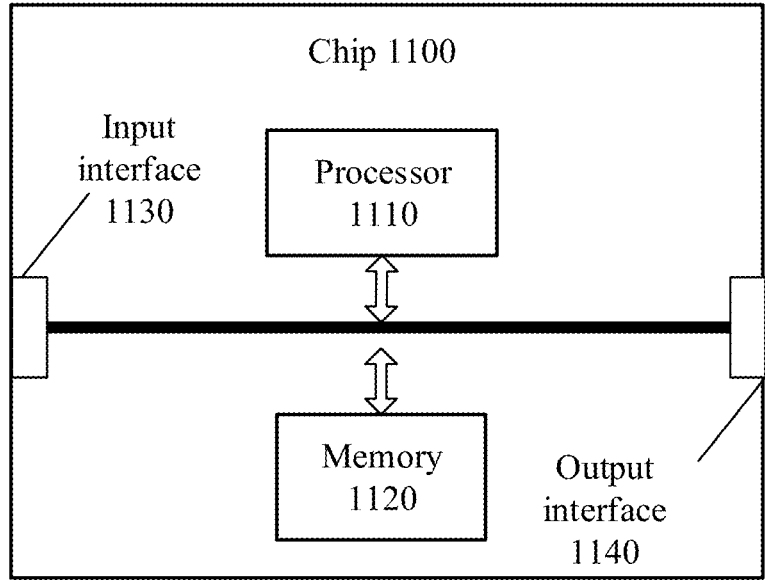
FIG. 11 is a schematic structural diagram of a chip 1100 according to implementations of the present disclosure.

FIG. 11 is a schematic structural diagram of a chip 1100 according to implementations of the present disclosure. The chip 1100 illustrated in FIG. 11 includes a processor 1110. The processor 1110 may invoke and run a computer program in a memory, so as to implement the methods in the implementations of the present disclosure.

Optionally, as illustrated in FIG. 11, the chip 1100 can further include a memory 1120. The processor 1110 can call and run a computer program in the memory 1120 to implement the methods in the implementations of the present disclosure.

The memory 1120 may be independent of the processor 1110, or may be integrated in the processor 1110.

Optionally, the chip 1100 can further include an input interface 1130, where the processor 1110 may control the input interface 1130 to communicate with other devices or chips, and specifically, may acquire information or data sent by other devices or chips.

Optionally, the chip 1100 can further include an output interface 1140. The processor 1110 may control the output interface 1140 to communicate with other devices or chips, and specifically, may output information or data to other devices or chips.

Optionally, the chip may be applied to the terminal device in the implementations of the present disclosure, and the chip may implement corresponding processes implemented by the terminal device in various methods in the implementations of the present disclosure, and for brevity, details are not described herein again.

Optionally, the chip may be applied to the network device in the implementations of the present disclosure, and the chip may implement corresponding processes implemented by the network device in various methods in the implementations of the present disclosure, and for brevity, details are not described herein again.

It is to be understood that the chip mentioned in the implementations of the present disclosure may also be referred to as a system-level chip, a system chip, a chip system, a system-on-chip, or the like.

The processor mentioned above may be a general purpose processor, a digital signal processor (DSP), a field programmable gate array (FPGA), an application specific integrated circuit (ASIC), or another programmable logic device, a transistor logic device, a discrete hardware component, or the like. The general processor may be a microprocessor or any conventional processor.

The memory mentioned above may be a volatile memory or a non-volatile memory, or may include both a volatile memory and a non-volatile memory. The non-volatile memory may be a read-only memory (ROM), a programmable ROM (PROM), an erasable PROM (EPROM), an electrically erasable PROM (EEPROM), or a flash memory. The volatile memory may be a random access memory (RAM).

It is to be understood that the foregoing memories are exemplary but not limitative illustrations. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ES-DRAM), a synchronous link DRAM (SDRAM), a direct rambus RAM (DR RAM), etc. That is to say, the memory in the implementations of the present disclosure is intended to include, but is not limited to, these and any other suitable types of memory.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer may be a general-purpose computer, a special-purpose computer, a computer network, or other programmable apparatuses. The computer instruction may be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It is to be understood that, in various implementations described herein, the magnitude of a sequence number of each process does not mean an order of execution, and the order of execution of each process should be determined by its function and an internal logic and shall not constitute any limitation to an implementation process of implementations.

A person skilled in the art may clearly understand that, for the purpose of convenient and brief illustration, for a specific working process of the foregoing system, apparatus, and unit, reference may be made to a corresponding process in the foregoing method implementations, and details are not described herein again.

The foregoing illustrations are merely specific implementations of the present disclosure, but are not intended to limit the scope of protection of the present disclosure. Any variation or replacement readily figured out by a person skilled in the art within the technical scope of the present disclosure shall belong to the scope of protection of the present disclosure. Therefore, the scope of protection of the present disclosure should be subject to the scope of protection of the claims.

What is claimed is:

1. A method for determining channel state information (CSI), comprising:

determining, by a terminal device, a number of bits of a CSI-reference signal (CSI-RS) resource indicator (CRI) in CSI and non-zero power (NZP) CSI-RS resources respectively indicated by different values of the CRI in the CSI, according to whether an NZP CSI-RS resource is available for CSI measurements under different measurement assumptions;

wherein determining the number of the bits of the CRI in the CSI comprises:

determining that the number of the bits of the CRI is $\log_2(K+N)$ when the NZP CSI-RS resource is available for the CSI measurements under the different measurement hypotheses; and determining that the number of the bits of the CRI is $\log_2(K-N)$ when the NZP CSI-RS resource is unavailable for the CSI measurements under the different measurement hypotheses;

wherein K represents the number of NZP CSI-RS resources in an NZP CSI-RS resource set for channel measurements, and N represents the number of channel measurement resource (CMR) pairs for a CSI measurement under a measurement hypothesis of non-coherent joint transmission (NC-JT) in the NZP CSI-RS resource set for channel measurements.

2. The method of claim 1, wherein the CSI measurements under the different measurement assumptions comprise a single channel measurement resource (CMR)-based CSI measurement and a single CMR pair-based CSI measurement.

3. The method of claim 1, comprising:

determining, by the terminal device, whether the NZP CSI-RS resource is available for the CSI measurements under the different measurement assumptions according to first higher-layer signaling;

wherein the first higher-layer signaling indicates whether an NZP CSI-RS resource for a single CMR-based CSI measurement is available for a single CMR pair-based CSI measurement.

4. The method of claim 1, comprising:

determining, by the terminal device, whether the NZP CSI-RS resource is available for the CSI measurements under the different measurement assumptions according to terminal-capability report information;

wherein the terminal-capability report information indicates whether an NZP CSI-RS resource for a single CMR-based CSI measurement is available for a single CMR pair-based CSI measurement.

5. The method of claim 1, wherein determining the NZP CSI-RS resources respectively indicated by the different values of the CRI in the CSI comprises at least one of:

when the NZP CSI-RS resource is available for the CSI measurements under the different measurement assumptions, determining that each of part of the values of the CRI indicates a resource in K NZP CSI-RS resources in an NZP CSI-RS resource set for channel measurements, and each of remaining part of the values of the CRI indicates a CMR pair in N CMR pairs for a CSI measurement under a measurement assumption of NC-JT; and when the NZP CSI-RS resource is unavailable for the CSI measurements under the different measurement assumptions, determining that each of part of the values of the CRI indicates a resource in K−2N NZP CSI-RS resources for a CSI measurement under a measurement assumption of single TRP transmission, and each of remaining part of the values of the CRI indicates a CMR pair in the N CMR pairs for the CSI measurement under the measurement assumption of NC-JT.

6. The method of claim 1, wherein determining the NZP CSI-RS resources respectively indicated by the different values of the CRI in the CSI comprises at least one of:

when the NZP CSI-RS resource is available for the CSI measurements under the different measurement assumptions, determining that each of different values of a first CRI in the CSI indicates a resource in K NZP CSI-RS resources in an NZP CSI-RS resource set for channel measurements, and each of different values of a second CRI in the CSI indicates a CMR pair in N CMR pairs for a CSI measurement under a measurement assumption of NC-JT; and when the NZP CSI-RS resource is unavailable for the CSI measurements under the different measurement assumptions, determining that each of the different values of the first CRI in the CSI indicates a resource in K−2N NZP CSI-RS resources for a CSI measurement under a measurement assumption of single TRP transmission, and each of the different values of the second CRI in the CSI indicates a CMR pair in the N CMR pairs for the CSI measurement under the measurement assumption of NC-JT;

wherein K represents the number of NZP CSI-RS resources in the NZP CSI-RS resource set for channel measurements, and N represents the number of CMR pairs for the CSI measurement under the measurement assumption of NC-JT in the NZP CSI-RS resource set for channel measurements.

7. A terminal device, comprising:
a transceiver;
a processor coupled to the transceiver; and
a memory configured to store a computer program;
wherein the processor being configured to execute the computer program to cause the terminal device to:

determine, according to whether a non-zero power (NZP) channel state information-reference signal (CSI-RS) resource is available for CSI measurements under different measurement assumptions, the number of bits of a CSI-RS resource indicator (CRI) in CSI and NZP CSI-RS resources respectively indicated by different values of the CRI in the CSI;

wherein the processor configured to execute the computer program to cause the terminal device to determine the number of the bits of the CRI in the CSI is configured to execute the computer program to cause the terminal device to:

determine that the number of the bits of the CRI is $\log_2(K+N)$ when the NZP CSI-RS resource is available for the CSI measurements under the different measurement assumptions; and determine that the number of the bits of the CRI is $\log_2(K-N)$ when the NZP CSI-RS resource is unavailable for the CSI measurements under the different measurement assumptions;

wherein K represents the number of NZP CSI-RS resources in an NZP CSI-RS resource set for channel measurements, and N represents the number of channel measurement resource (CMR) pairs for a CSI measurement under a measurement assumption of non-coherent joint transmission (NC-JT) in the NZP CSI-RS resource set for channel measurements.

8. The terminal device of claim 7, wherein the CSI measurements under the different measurement assumptions comprise a single channel measurement resource (CMR)-based CSI measurement and a single CMR pair-based CSI measurement.

9. The terminal device of claim 7, wherein the processor is configured to execute the computer program to cause the terminal device to:

determine whether the NZP CSI-RS resource is available for the CSI measurements under the different measurement assumptions according to first higher-layer signaling;

wherein the first higher-layer signaling indicates whether an NZP CSI-RS resource for a single CMR-based CSI measurement is available for a single CMR pair-based CSI measurement.

10. The terminal device of claim 7, wherein the processor is configured to execute the computer program to cause the terminal device to:

determine whether the NZP CSI-RS resource is available for the CSI measurements under the different measurement assumptions according to terminal-capability report information;

wherein the terminal-capability report information indicates whether an NZP CSI-RS resource for a single CMR-based CSI measurement is available for a single CMR pair-based CSI measurement.

11. The terminal device of claim 7, wherein the processor configured to execute the computer program to cause the terminal device to determine the NZP CSI-RS resources respectively indicated by the different values of the CRI in the CSI is configured to execute the computer program to cause the terminal device to perform at least one of:

determining, when the NZP CSI-RS resource is available for the CSI measurements under the different measurement assumptions, that each of part of the values of the CRI indicates a resource in K NZP CSI-RS resources in an NZP CSI-RS resource set for channel measurements, and each of remaining part of the values of the CRI indicates a CMR pair in N CMR pairs for a CSI measurement under a measurement assumption of NC-JT; and determining, when the NZP CSI-RS resource is unavailable for the CSI measurements under the different measurement assumptions, that each of part of the values of the CRI indicates a resource in K−2N NZP CSI-RS resources for a CSI measurement under a measurement assumption of single TRP transmission, and each of remaining part of the values of the CRI indicates a CMR pair in the N CMR pairs for the CSI measurement under the measurement assumption of NC-JT.

12. The terminal device of claim 7, wherein the processor configured to execute the computer program to cause the terminal device to determine the NZP CSI-RS resources respectively indicated by the different values of the CRI in the CSI is configured to execute the computer program to cause the terminal device to perform at least one of:

determining, when the NZP CSI-RS resource is available for the CSI measurements under the different measurement assumptions, that each of different values of a first CRI in the CSI indicates a resource in K NZP CSI-RS resources in an NZP CSI-RS resource set for channel measurements, and each of different values of a second CRI in the CSI indicates a CMR pair in N CMR pairs for CSI measurements under a measurement assumption of NC-JT; and determining, when the NZP CSI-RS resource is unavailable for the CSI measurements under the different measurement assumptions, that each of the different values of the first CRI in the CSI indicates a resource in K−2N NZP CSI-RS resources for a CSI measurement under a measurement assumption of single TRP transmission, and each of the different values of the second CRI in the CSI indicates a CMR pair in the N CMR pairs for the CSI measurement under the measurement assumption of NC-JT;

wherein K represents the number of NZP CSI-RS resources in the NZP CSI-RS resource set for channel measurements, and N represents the number of CMR pairs for the CSI measurement under the measurement assumption of NC-JT in the NZP CSI-RS resource set for channel measurements.

13. The terminal device of claim 7, wherein the processor configured to execute the computer program to cause the terminal device to determine the NZP CSI-RS resources respectively indicated by the different values of the CRI in the CSI is configured to execute the computer program to cause the terminal device to perform at least one of:

determining, when the NZP CSI-RS resource is available for the CSI measurements under the different measurement assumptions, that each of different values of a first CRI in the CSI indicates a CMR pair in N CMR pairs for a CSI measurement under a measurement assumption of NC-JT, each of different values of a second CRI in the CSI indicates an NZP CSI-RS resource in a first CMR group in an NZP CSI-RS resource set for channel measurements, and each of different values of a third CRI in the CSI indicates an NZP CSI-RS resource in a second CMR group in the NZP CSI-RS resource set for channel measurements; and determining, when the NZP CSI-RS resource is unavailable for the CSI measurements under the different measurement assumptions, that each of the different values of the first CRI in the CSI indicates a CMR pair in the N CMR pairs for the CSI measurement under the measurement assumption of NC-JT, each of the different values of the second CRI in the CSI indicates a resource in $K_1$−N NZP CSI-RS resources for a CSI measurement under a measurement assumption of single TRP transmission in the first CMR group in the NZP CSI-RS resource set for channel measurements, and each of the different values of the third CRI in the CSI indicates a resource in $K_2$−N NZP CSI-RS resources for the CSI measurement under the measurement assumption of single TRP transmission in the second CMR group in the NZP CSI-RS resource set for channel measurements;

wherein K represents the number of NZP CSI-RS resources in the NZP CSI-RS resource set for channel measurements, N represents the number of CMR pairs for the CSI measurement under the measurement assumption of NC-JT in the NZP CSI-RS resource set for channel measurements, $K_1$ represents the number of NZP CSI-RS resources in the first CMR group in the NZP CSI-RS resource set, and $K_2$ represents the number of NZP CSI-RS resources in the second CMR group in the NZP CSI-RS resource set.

14. The terminal device of claim 7, wherein the processor is further configured to execute the computer program to cause the terminal device to:

receive an NZP CSI-RS resource set for channel measurements configured by a network device;

wherein the NZP CSI-RS resource set comprises a first CMR group and a second CMR group; and wherein the NZP CSI-RS resource set comprises at least one CMR pair for a CSI measurement under a measurement assumption of NC-JT, wherein each of the at least one CMR pair comprises a CMR in the first CMR group and a CMR in the second CMR group.

15. A network device comprising:

a transceiver;

a processor coupled to the transceiver; and a memory configured to store a computer program;

wherein the processor is configured to execute the computer program to cause the network device to:

determine, according to whether a non-zero power (NZP) channel state information-reference signal (CSI-RS) resource is available for CSI measurements under different measurement assumptions, the number of bits of a CSI-RS resource indicator (CRI) in CSI and NZP CSI-RS resources respectively indicated by different values of the CRI in the CSI;

wherein the processor configured to execute the computer program to cause the network device to determine the number of the bits of the CRI in the CSI is configured to execute the computer program to cause the network device to:

determine that the number of the bits of the CRI is $\log_2(K+N)$ when the NZP CSI-RS resource is available for the CSI measurements under the different measurement assumptions; and determine that the number of the bits of the CRI is $\log_2(K−N)$ when the NZP CSI-RS resource is unavailable for the CSI measurements under the different measurement assumptions;

wherein K represents the number of NZP CSI-RS resources in an NZP CSI-RS resource set for channel measurements, and N represents the number of channel measurement resource (CMR) pairs for a CSI measurement under a measurement assumption of non-coherent joint transmission (NC-JT) in the NZP CSI-RS resource set for channel measurements.

16. The network device of claim 15, wherein the CSI measurements under the different measurement assumptions comprise a single channel measurement resource (CMR)-based CSI measurement and a single CMR pair-based CSI measurement.

17. The network device of claim 15, wherein the processor is configured to execute the computer program to cause the network device to:

determine whether the NZP CSI-RS resource is available for the CSI measurements under the different measurement assumptions according to terminal-capability report information;

wherein the terminal-capability report information indicates whether an NZP CSI-RS resource for a single CMR-based CSI measurement is available for a single CMR pair-based CSI measurement.

18. The network device of claim 15, wherein the processor configured to execute the computer program to cause the network device to determine the NZP CSI-RS resources respectively indicated by the different values of the CRI in the CSI is configured to execute the computer program to cause the network device to perform at least one of:

determining, when the NZP CSI-RS resource is available for the CSI measurements under the different measurement assumptions, that each of part of the values of the CRI indicates a resource in K NZP CSI-RS resources in an NZP CSI-RS resource set for channel measurements, and each of remaining part of the values of the CRI indicates a CMR pair in N CMR pairs for a CSI measurement under a measurement assumption of NC-JT; and determining, when the NZP CSI-RS resource is unavailable for the CSI measurements under the different measurement assumptions, that each of part of the values of the CRI indicates a resource in $K-2N$ NZP CSI-RS resources for a CSI measurement under a measurement assumption of single TRP transmission, and each of remaining part of the values of the CRI indicates a CMR pair in the N CMR pairs for the CSI measurement under the measurement assumption of NC-JT.

19. The network device of claim 15, wherein the processor configured to execute the computer program to cause the network device to determine the NZP CSI-RS resources respectively indicated by the different values of the CRI in the CSI is configured to execute the computer program to cause the network device to perform at least one of:

determining, when the NZP CSI-RS resource is available for the CSI measurements under the different measurement assumptions, that each of different values of a first CRI in the CSI indicates a resource in K NZP CSI-RS resources in an NZP CSI-RS resource set for channel measurements, and each of different values of a second CRI in the CSI indicates a CMR pair in N CMR pairs for CSI measurements under a measurement assumption of NC-JT; and determining, when the NZP CSI-RS resource is unavailable for the CSI measurements under the different measurement assumptions, that each of the different values of the first CRI in the CSI indicates a resource in K-2N NZP CSI-RS resources for a CSI measurement under a measurement assumption of single TRP transmission, and each of the different values of the second CRI in the CSI indicates a CMR pair in the N CMR pairs for the CSI measurement under the measurement assumption of NC-JT;

wherein K represents the number of NZP CSI-RS resources in the NZP CSI-RS resource set for channel measurements, and N represents the number of CMR pairs for the CSI measurement under the measurement assumption of NC-JT in the NZP CSI-RS resource set for channel measurements.

20. The network device of claim 15, wherein the processor configured to execute the computer program to cause the network device to determine the NZP CSI-RS resources respectively indicated by the different values of the CRI in the CSI is configured to execute the computer program to cause the network device to perform at least one of:

determining, when the NZP CSI-RS resource is available for the CSI measurements under the different measurement assumptions, that each of different values of a first CRI in the CSI indicates a CMR pair in N CMR pairs for a CSI measurement under a measurement assumption of NC-JT, each of different values of a second CRI in the CSI indicates an NZP CSI-RS resource in a first CMR group in an NZP CSI-RS resource set for channel measurements, and each of different values of a third CRI in the CSI indicates an NZP CSI-RS resource in a second CMR group in the NZP CSI-RS resource set for channel measurements; and determining, when the NZP CSI-RS resource is unavailable for the CSI measurements under the different measurement assumptions, that each of the different values of the first CRI in the CSI indicates a CMR pair in the N CMR pairs for the CSI measurement under the measurement assumption of NC-JT, each of the different values of the second CRI in the CSI indicates a resource in $K_1-N$ NZP CSI-RS resources for a CSI measurement under a measurement assumption of single TRP transmission in the first CMR group in the NZP CSI-RS resource set for channel measurements, and each of the different values of the third CRI in the CSI indicates a resource in $K_2-N$ NZP CSI-RS resources for the CSI measurement under the measurement assumption of single TRP transmission in the second CMR group in the NZP CSI-RS resource set for channel measurements;

wherein K represents the number of NZP CSI-RS resources in the NZP CSI-RS resource set for channel measurements, N represents the number of CMR pairs for the CSI measurement under the measurement assumption of NC-JT in the NZP CSI-RS resource set for channel measurements, $K_1$ represents the number of NZP CSI-RS resources in the first CMR group in the NZP CSI-RS resource set, and $K_2$ represents the number of NZP CSI-RS resources in the second CMR group in the NZP CSI-RS resource set.

* * * * *